United States Patent [19]
Miller et al.

[11] Patent Number: 5,747,180
[45] Date of Patent: May 5, 1998

[54] ELECTROCHEMICAL SYNTHESIS OF QUASI-PERIODIC QUANTUM DOT AND NANOSTRUCTURE ARRAYS

[75] Inventors: Albert E. Miller, Granger; Supriyo Bandyopadhyay, South Bend, both of Ind.

[73] Assignee: University of Notre Dame Du Lac, Notre Dame, Ind.

[21] Appl. No.: 760,322

[22] Filed: Dec. 5, 1996

Related U.S. Application Data

[63] Continuation of Ser. No. 445,046, May 19, 1995, abandoned.

[51] Int. Cl.$^6$ .............. B32B 3/10; B32B 3/26; C25D 11/02; C25D 11/18
[52] U.S. Cl. .............. 428/601; 428/614; 428/620; 428/629; 428/472.2; 428/469; 205/124; 205/173; 205/219; 205/324; 205/333
[58] Field of Search .............. 428/601, 614, 428/632, 469, 472.2, 629, 923, 924, 620, 645; 205/206, 219, 324, 333, 173, 124, 213

[56] References Cited

U.S. PATENT DOCUMENTS

| | | | |
|---|---|---|---|
| 4,109,287 | 8/1978 | Kawai et al. | 205/173 |
| 4,650,708 | 3/1987 | Takanashi | 428/469 |
| 4,904,349 | 2/1990 | Tokushima et al. | 205/173 |
| 4,925,736 | 5/1990 | Tsuya et al. | 428/472.2 |
| 4,968,389 | 11/1990 | Satoh et al. | 205/173 |
| 5,074,971 | 12/1991 | Tsuya et al. | 205/223 |
| 5,202,290 | 4/1993 | Mokovits | 437/233 |
| 5,470,636 | 11/1995 | Wakui et al. | 205/173 |

OTHER PUBLICATIONS

"Curie–Weiss" Behavior and Fluctuation Phenomena in the Resistive Transitions of Dirty Superconductors, Physical Review Letters, vol. 20, No. 17, Apr. 22, 1968.

Phonon scattering and energy relaxation in two–, one–, and zero–dimensional electron gases, Physical Review B, vol. 42, No. 14, Nov. 15, 1990–1.

Einfluss der Kondensation bei tiefen Temperaturen auf den elektrischen Widerstand und die Supraleitung für verschiedene Metalle, Zeitschrift für Physik, Bd. 138, S. 109–120 (1954).

Nano Particulates, Nano Structured Materials & Coatings, and Fullerenes: A Search of the U.S. Patent Literature, 1971–1994.

Electronic Structure and Photoexcited–Carrier Dynamics in Nanometer–Size CdSe Clusters, Physical Review Letters, (vol. 65, No. 13), Sep. 24 1990.

Molecular–beam epitaxy growth of quantum dots from strained coherent uniform islands of InGaAs on GaAs, J.Vac. Sci. Technol. B 12(2), Mar./Apr., 1994.

Field–Induced Optical Nonlinearity Due to Virtual Transitions in Semiconductor Quantum–Well Stuctures, Physica Reivew Letters, vol. 59, No. 9, Aug. 1987.

Excitonic optical nonlinearity and exciton dynamics in semiconductor quantum dots, Physical Review B, vol. 36, No. 17, Dec. 1987.

Electron–Beam–Induced Damage Study in GaAs–AlGaAs Heterostructures as Determined by Magnetotransport Characterization, IEEE Transactions on Electron Devices, vol. 37, No. 6, Jun., 1990.

(List continued on next page.)

*Primary Examiner*—John J. Zimmerman
*Attorney, Agent, or Firm*—Barnes & Thornburg

[57] ABSTRACT

A method of fabricating two-dimensional regimented and quasi periodic arrays of metallic and semiconductor nanostructures (quantum dots) with diameters of ~100 Å (10 nm) includes the steps of polishing and anodizing a substrate to form a regimented quasi-periodic array of nanopits. The array forms a template for metallic or semiconductor material. The desired material is deposited in the nanopits by immersing the substrate in an appropriate solution and using the substrate as one cathode and inserting a second cathode in the solution.

31 Claims, 25 Drawing Sheets

OTHER PUBLICATIONS

Nanowires formed in anodic oxide nanotemplates, J. Mater. Res. vol. 9, No. 4, Apr., 1994.

Superconductivity in Granular Aluminum Films, Physical Review, vol. 168, No. 2, Apr. 10, 1968.

Materials for magnetic refrigeration between 2K and 20K, Cryogenics, Feb., 1982.

Magnetic Advantage, Science News, vol. 142, Aug. 29, 1992.

Giant Magnetoresistance in Heterogeneous Cu–Co Alloys, Physical Review Letters, vol. 68, No. 25, Jun. 22, 1992.

Resistance and Superconductivity of Small Lead Particles, Surface Science 106 (1981) 373–381.

Extraordinary Hall Effect and Giant Magnetoresistance in the Granular Co–Ag System, Physical Review Letters, vol. 69, No. 22, Nov. 30, 1992.

Observation of Localized Above-Barrier Excitons in Type–I Superlattices, Physical Review Letters, vol. 68, No. 21, May 25, 1992.

Convection Cells in Vibrating Granular Media, Physical Review Letters, vol. 69, No. 9, Aug. 31, 1992.

Ultrafast Switching with Nonlinear Optics, Physics Today, May 1994.

Nonowire Array Composites, Science, vol. 263, Feb. 11, 1994.

Effects of electron–beam–induced damage on leakage currents in back–gated GaAs/AlGaAs devices, Semiconduct. Sci. Technol., vol. 8, 1347 (1993), no month of publication.

Increased thermal generation rate in GaAs due to electron-beam metallization, J. Appl. Phys. 71 (9), May 1, 1992.

Hellium–ion damage and nanowire fabrication in GaAs/AlGaAs heterostructures, J. Appl. Phys. 68 (3), Aug. 1, 1990.

Nonlinear Optics, Physics Today, May, 1994.

Anodic Oxide Films on Aluminum, J. W. Diggle, T. C. Downie and C. W. Goulding, Received Jul. 29, 1968.

Direct writing in Si with a scanning tunneling microscope, Appl. Phys. Lett. 55 (13), Sep. 25, 1989.

Quantum wires, quantum boxes and related structures: Physics, device potentials and structural requirements, Surface Science 267 no month (1992) 623–629.

Radiative recombination in GaAs–Al$_x$ Ga$_{1-x}$ As quantum dots, Appl. Phy. Lett. 61 (8), Aug. 24, 1992.

Investigation of high–quantum efficiency InGaAs/InP and InGaAs/GaAs quantum dots, J. Va. Sci. Technol. B 10(6), Nov./Dec., 1992.

FIG.18

TABLE I

|  | MINIMUM | MAXIMUM | MEAN | STD. DEV. |
|---|---|---|---|---|
| AREA ($A^2$) | 14,000 | 26,800 | 20,300 | 4300 |
| PORE DIA (A) | 135 | 184 | 160 | 17.2 |
| INTER-PORE DIST.(A) | 413 | 465 | 433 | 17 |

FIG.19

TABLE II

|  | MINIMUM | MAXIMUM | MEAN | STD. DEV. |
|---|---|---|---|---|
| AREA ($A^2$) | 47,874 | 102,982 | 81,282 | 11,548 |
| PORE DIA (A) | 246 | 362 | 321 | 24 |
| ROUNDNESS (%) | 57 | 99 | 82 | 12 |

LOW INTENSITY INCIDENT BEAM

HIGH INTENSITY INCIDENT BEAM

FIG. 28(a)
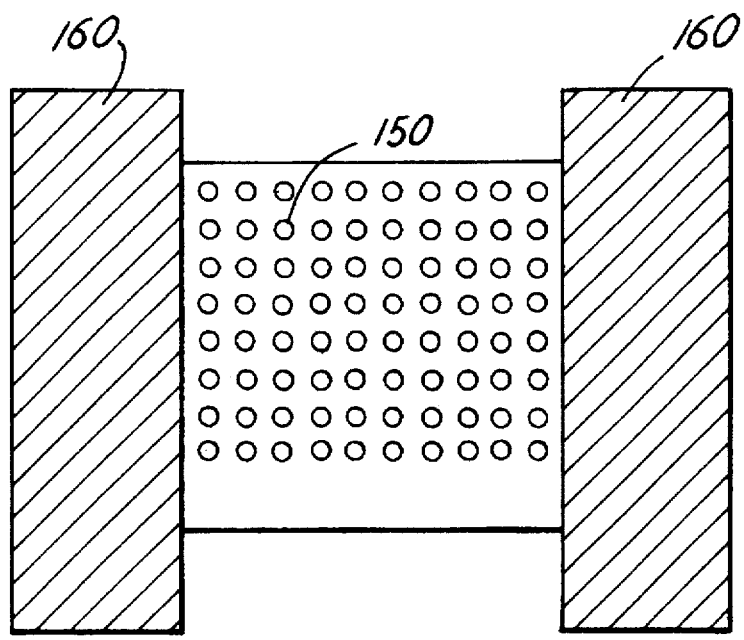
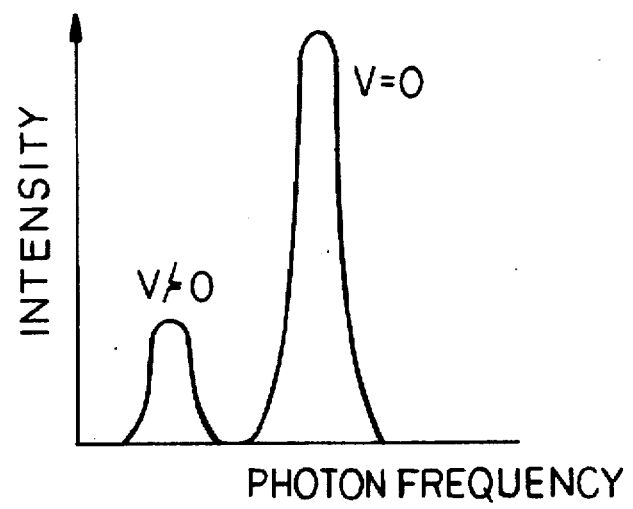
FIG. 28(b)

ELECTROCHEMICAL SYNTHESIS OF QUASI-PERIODIC QUANTUM DOT AND NANOSTRUCTURE ARRAYS

This application is a continuation of application Ser. No. 08/445,046, filed May 19, 1995 now abandoned.

BACKGROUND AND SUMMARY OF THE INVENTION

The present invention relates to nanofabrication and nanosynthesis and, in particular, to fabrication and synthesis of regimented and quasi-periodic nanostructures.

Nanostructures have wide applications in electronics, optics, magnetics and superconductivity. As of now, nanostructures that are commercially or otherwise available are mostly fabricated using conventional direct write lithography. Traditionally, this method involves a three step process: Film growth (such as by atomic layer epitaxy or organometallic chemical vapor deposition), followed by patterning (such as by direct-write lithography) and finally etching (such as by reactive ion etching).

These processes usually employ a beam (electron beam, ion beam or x-ray) to delineate nanostructures. It is well-known however that such conventional techniques can cause significant damage to processed nanostructures. Damage is incurred in two stages: During the delineation step when the material is exposed to relatively high energy electron beam, ion beam or x-ray and during post processing (such as reactive ion etching) when the delineated patterns are etched to produce the final nanostructures. During the etching step, which is usually carried out in the presence of reactive ions, the nanostructures are subjected to corrosive ions and deep ultraviolet radiation which can cause extensive material damage.

The types of damage described above may introduce a host of spurious charges, traps, vacancies and surface states in the nanostructures. The spurious charges can have a disastrous effect in many electronic applications and traps (non-radiative recombination centers) can be a serious problem in optical applications. Surface states may pin the Fermi level in a semiconductor quantum dot in the middle of the energy gap and completely deplete a structure of mobile carriers if its diameter is less than ~100 Å. A depleted structure is practically useless for any application. In short, process related damages are a serious issue in nanosynthesis.

Conventional direct write lithography processes (including the most modern scanning tip lithography) are serial processes whereby each wafer (or product) has to be patterned one at a time. Each wafer may take several hours so that producing a sufficient quantity may take an unreasonable amount of time. Because of this very slow throughput, many commercial producers have avoided the market of nanostructures. Also, in nanosynthesis techniques, nanostructures are produced on a suitable substrate. The surface of the substrate must usually be planar and not curved. Finally, capital investment for traditional nanosynthesis techniques is typically very large, even for small scale production.

Accordingly, it is an object of the present invention to provide a new and useful method of producing quasi-periodic quantum dot and nanostructure arrays.

Another object of the present invention is to provide a method of nanosynthesis that will reduce processing damage to the quantum dot and nanostructure arrays.

Still another object of the present invention is to provide a method for mass production of quantum dot and nanostructure arrays.

Still another object of the present invention is to provide a less expensive method of fabricating quantum dot and nanostructure arrays.

These and other objects of the present invention are attained by the provision of a method of fabricating nanostructures comprising the steps of electropolishing a substrate so as to form pits in the substrate, anodizing the substrate to form an oxide layer on the substrate having a plurality of pores and depositing a desired material within the pores. Anodization is achieved by immersing the substrate in an acidic bath, utilizing the substrate as a first electrode, immersing a second electrode in the bath, and passing current through the electrodes. The material is deposited in the pores by immersing the substrate and oxide film in an acidic bath, utilizing the substrate as a first electrode, immersing a second electrode in the bath, and passing current through the electrodes.

According to one embodiment of the method, the surface energy of the substrate is increased in certain regions prior to anodization. This may be done by cold working. The substrate may be a single crystal.

According to another embodiment of the method, a compound material may be deposited in the pores by the additional step of immersing the anodized substrate in a boiling solution of salt containing cations of the compound.

According to other embodiments of the method, the substrate and/or oxide layer may be removed. A layer of a second material may be deposited on the oxide layer and the deposited material prior to removing the substrate and/or oxide layer.

According to another embodiment of the present invention, a method of fabricating nanostructures comprises the steps of selecting a semiconducting substrate, depositing a layer of metal on the substrate, electropolishing the layer of metal so as to form pits therein, anodizing the metal layer so as to convert substantially all of the metal layer to an oxide layer containing pores, and depositing material in the pores.

According to another embodiment of the present invention, a nanostructure comprises a first layer of metal, a layer of oxide having pores disposed on the first layer of metal, a second metal deposited in the pores, and a third metal deposited on the oxide and second metal.

Other objects, advantages and novel features of the present invention will now be apparent to those skilled in the art from the following detailed description of the preferred embodiments and accompanying drawings.

BRIEF DESCRIPTION OF THE DRAWINGS

FIG. 18 is a table showing the statistics of pore size and distribution for the sample shown in FIG. 16.

FIG. 19 is a table showing the statistics of pore size and distribution for the sample shown in FIG. 17.

FIGS. 28(a) shows an ultrafast electro-optical switch made according to the process of the present invention.

FIG. 28(b) shows the photoluminescence spectrum for the device of FIG. 28(a).

DETAILED DESCRIPTION OF THE PREFERRED EMBODIMENTS

Figure 1A:
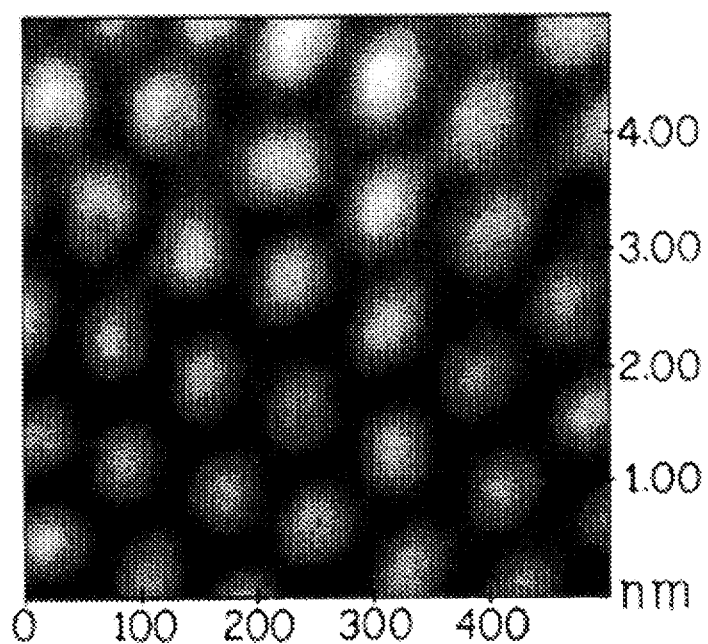
FIG. 1(a) is an atomic force micrograph of the top of an aluminum surface electropolished at 60 V for 30 seconds as part of the method of the present invention.
Figure 1B:
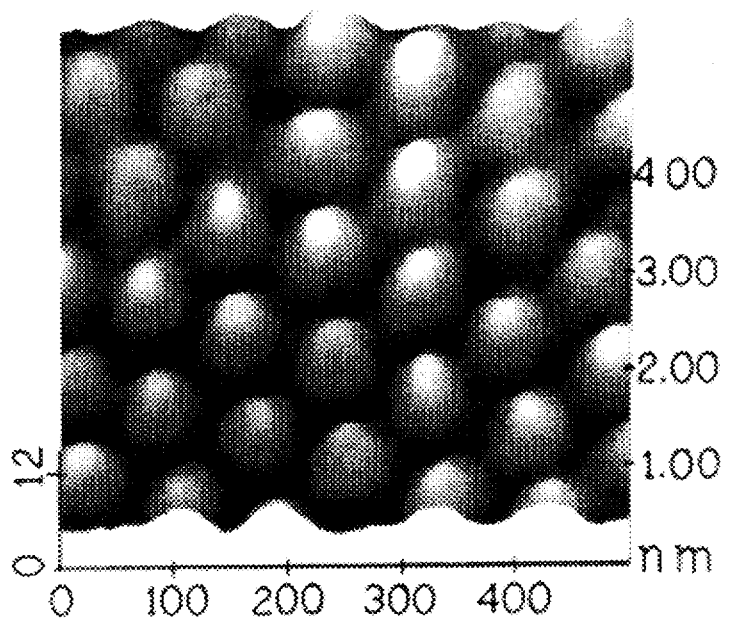
FIG. 1(b) is an atomic force micrograph showing a side view of the electropolished surface shown in FIG. 1(a).
Figure 2A:
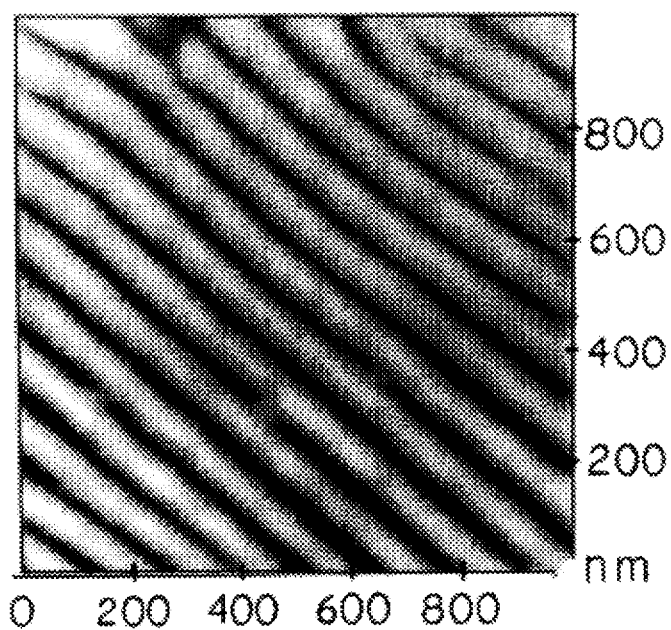
FIG. 2(a) is an atomic force micrograph of the top of an aluminum surface electropolished at 40 V for 10 seconds as part of the method of the present invention.
Figure 2B:
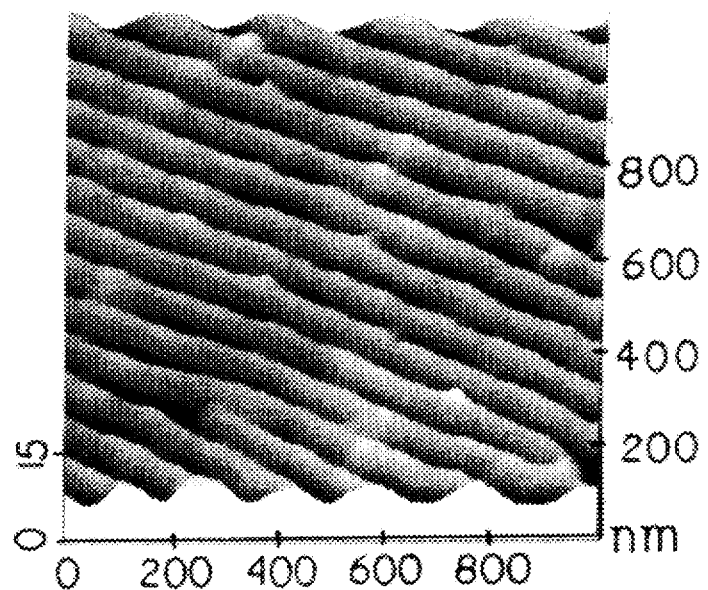
FIG. 2(b) is an atomic force micrograph showing a side view of the electropolished surface shown in FIG. 2(a).

Nanostructures are fabricated in accordance with the present invention by electropolishing a 99.997% pure aluminum substrate at a constant electrostatic potential of 60 volts for 30 seconds. This produces an atomically smooth surface with a hexagonal pattern of quasi-periodic arrangement of nanopits, a top view of which is shown by the atomic force microscopy (AFM) picture of FIG. 1(a). FIG. 1(b) is a side view thereof. If the electropolishing is carried out at 40 V for 40 seconds, then a parallel array of troughs and crests forms on the surface as shown in FIG. 2(a). FIG. 2(b) is a side view thereof. As described more fully below, material may be deposited in these troughs to form a periodic array of "quantum wires."

Instead of using an aluminum substrate, one can also deposit a thin layer of aluminum on any compatible substrate (such as silicon) by resistive evaporation and then anodize this layer. This allows the technique to be compatible with other established semiconductor technologies such as the silicon technology which is the workhorse of micro- and nanoelectronics. One can also choose Ti, Zr or Ta for anodization.

Figure 3:
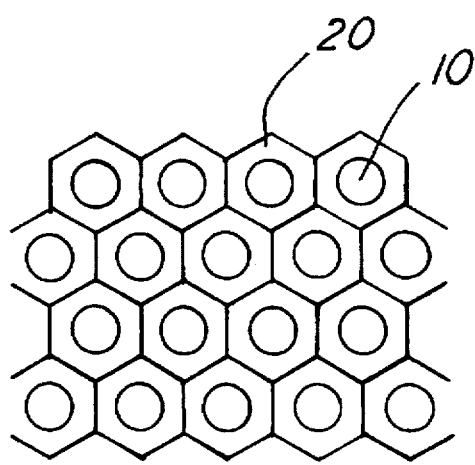
FIG. 3 shows a porous cellular film with a hexagonal periodic arrangement of pores.
Figure 4:
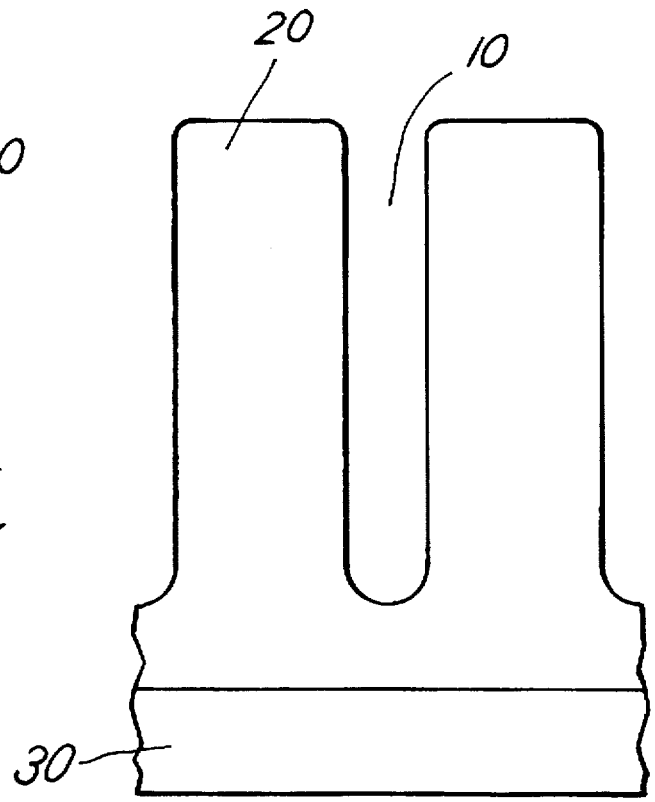
FIG. 4 is a vertical cross-section of one of the cells taken along line 3—3 in FIG. 3.
Figure 5A:
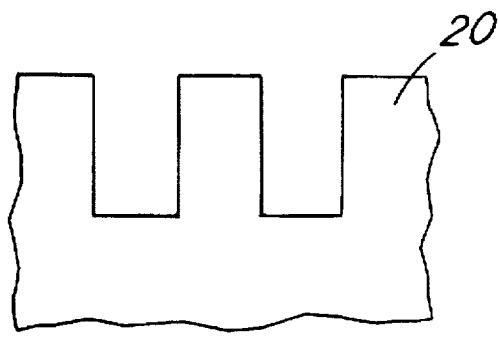
FIGS. 5(a)–(d) illustrate one of the methods according to the present invention wherein quantum dots are formed in an oxide matrix joined to a deposited film, and the oxide is subsequently removed.
Figure 5B:
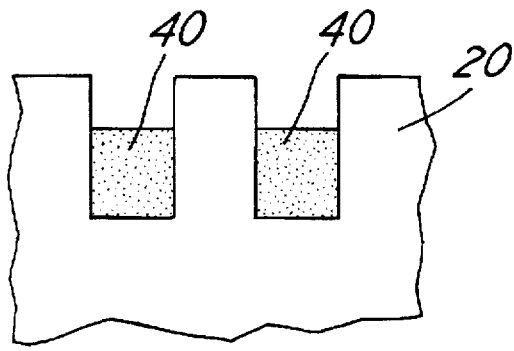
Figure 5C:
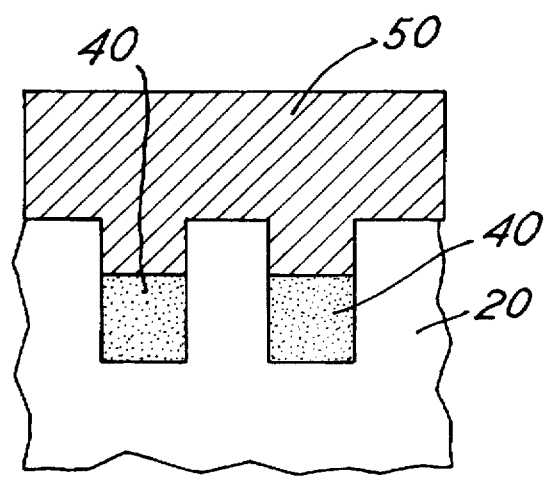
Figure 5D:
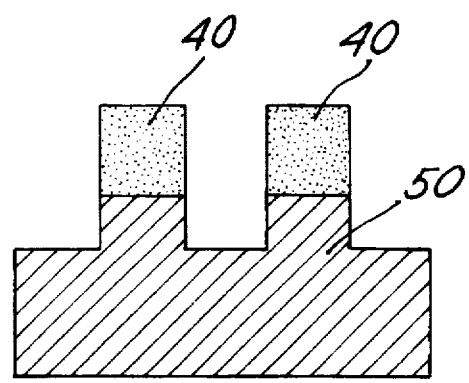

The electropolished sample is then anodized in an acid solution under controlled conditions of temperature, anodizing current, voltage, pH and time. The anodization may be carried out, for example, at a constant current density of 40 mA/cm$^2$ for 10 seconds in 15% $H_2SO_4$ (pH=0.6) at room temperature. It produces a film of aluminum oxide on the surface of the aluminum substrate. The aluminum oxide film has a regimented and periodic hexagonal array of pores. Regimented arrangement of the pores is self-organized. A schematic of pores 10 in the oxide matrix 20 is shown in FIG. 3. FIG. 4 is a cross-section of one of the pores, also showing the substrate 30. The pore diameter and the center-to-center separation between the pores can be controlled by the temperature, anodizing current, pH and the specific acid solution. For example, sulfuric acid yields smaller pores than oxalic acid, which in turn yields smaller pores than phosphoric acid. Pore size increases with increasing anodization temperature. Increasing the anodization current yields larger pores with better regimentation. Better control may also be achievable by anodizing in a lower pH solution for a longer period of time. The pore depth (or film thickness) can also be controlled by the same parameters in addition to anodizing time. Control of pore diameter between 40 and 2000 Å can be achieved and the separation between pores can be made as small as 40 Å. The pore depth can be varied between a few hundred angstroms and a few microns by varying the time of anodization which varies the thickness of the deposited film.

The two-dimensional periodic cellular matrix in the aluminum oxide film 20 (FIG. 3) acts as a template for hosting either quantum dots (for small pore depth) or quantum wires (for large pore depth). The desired material is selectively ac electrodeposited within the pores and the finished product is a periodic, regimented array of quantum dots or wires of the material embedded in a surrounding insulator and dielectric, namely aluminum oxide.

The electrodeposition is carried out by first washing the porous film in distilled water and drying it. The pores are enlarged if needed by dissolution of the aluminum oxide walls surrounding the pores in an aqueous acid solution, such as a 15% sulfuric acid solution if anodization is carved out in $H_2SO_4$. It may be desirable to enlarge the pores in a solution of the same acid used for anodization. After washing, the pores are filled with the desired material. For most metals (such as ferromagnetic Fe and Ni) the porous film is placed in an acidic, non-cyanide bath that does not attack aluminum oxide. Current is passed at a suitable voltage using the aluminum substrate as an electrode and a graphite rod immersed in the bath as the counter electrode. This electrodeposits the material preferentially within the pores since the pores offer the least resistance paths between the two electrodes. To control the filling factor (how much of the pore is filled up), one can monitor the surface resistivity of the film. The surface resistivity correlates very well with the filling factor and can be used to calibrate this process.

For example, lead can be deposited in the pores by immersing the anodized aluminum, with the porous aluminum oxide film on top, in an acidic, non-cyanide bath containing $Pb(CH_3COO)_2$ (20 gm/L), boric acid (25 gm/L) and a few drops of acetic acid to make a clear solution. AC current is passed at constant rms potential chosen between 15 and 30 volts. The electrodes are the anodized aluminum substrate and a graphite rod. The time of electrodeposition depends on the degree of desired pore filling and is typically a few seconds. The $Pb^{++}$ ions in the solution are preferentially deposited as metallic $Pb^0$ within the pores since the pores provide the least resistance paths between the two electrodes.

For compound semiconductors like CdS and ZnS, ac electrolysis is performed for 10 seconds at an rms current density of 40 mA/cm² by immersing the anodized aluminum in $H_2SO_4$ which leaves behind the $S^{--}$ ion in the pores. This is followed by a 1 minute immersion in boiling deionized water containing a 10% solution of $CdSO_4$ or $ZnSO_4$. This solution should be chemically pure. Usually, this is the major source of contamination. The cation $Cd^{++}$ or $Zn^{++}$ in the solution reacts with the $S^{--}$ in the pores to form CdS or ZnS. Deposition of CdS or ZnS takes place within the pores one molecule at a time thereby affording excellent control.

The process can be used to create quantum dots of ZnTe, by using telluric acid and zinc sulfate, CdTe (telluric acid and cadmium sulphate), ZnSe (selenic acid and zinc sulphate), CdSe (selenic acid and cadmium sulphate), GaAs (arsenic acid and gallium sulphate), InAs(arsenic acid and indium sulphate), InP (phosphoric acid and indium sulphate), GaP (phosphoric acid and gallium sulphate). Those skilled in the art will recognize that numerous other compounds may be deposited in similar fashion. The bath can be used for several successive operations if material purity is not a serious concern. The rinse water is treated by usual chemical treatment or ion exchange before being drained.

If the materials electrodeposited within the pores are not crystalline, crystallinity may be restored by rapid thermal annealing following the deposition. For example, CdS can be anneal at 150° C. for 6 hours to restore crystallinity.

The presence of aluminum oxide does not affect most applications since it is an insulator and optically transparent at most useful ranges of optical or microwave frequencies. The underlying aluminum, however, is conducting and can cause free-carrier absorption in optical applications or eddy-current losses in microwave applications. If desired, the aluminum can be removed in two ways. First, a thin layer of aluminum can be deposited on a chosen (semiconducting) substrate and then anodized for a sufficient duration until the entire aluminum layer is consumed to make aluminum oxide. Alternatively, a thin layer of a chosen material can be electrodeposited, evaporated or sputtered on the top of the quantum dots or wires. The aluminum is then dissolved in a bromine/methanol solution. The aluminum oxide can be dissolved away in an acid solution, if desired. This results in a structure free of Al and aluminum oxide. This process is illustrated in FIGS. 5(a)-5(d), wherein the aluminum oxide layer is indicated by reference number 20, 40 are the quantum dots or wires, and 50 is the layer deposited on the aluminum oxide and the quantum dots or wires.

EXAMPLES

The processes described above have been carried out under various conditions with the results thoroughly analyzed, as described below.

Figure 6:
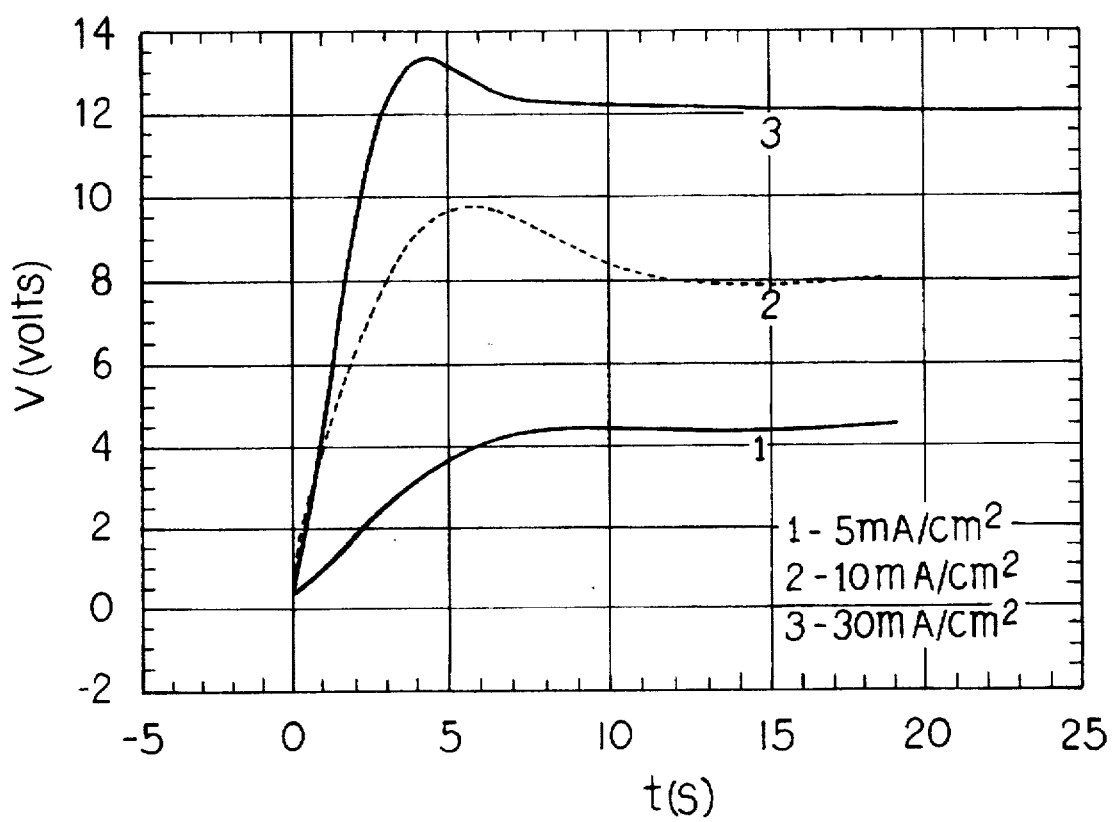
FIG. 6 is a voltage time plot showing anodization of aluminum as part of the method of the present invention.

99.997% pure Al coupons (15 mm×15 mm 100 μm) were anodized in 15% $H_2SO_4$ (pH=0.6) for various durations of time, at various constant current densities and at room temperature. Before anodizing, they were electropolished in perchloric acid/ethanol solution (62 cc perchloric acid: 700 cc ethanol: 100 cc butyl cellusolve: 137 cc distilled water) at a temperature of 15° C. and at a voltage of 60 V for 20 seconds in a LECO EP-50 electropolishing unit. The samples are then rinsed in distilled water and blow-dried. The anodization is carried out in an EG&G KO235 flat cell using a platinum wire mesh cathode. Constant current densities from 5–40 mA/cm² are maintained with an EG&G 173 potentiostat operating in constant current mode. The time dependence of the resulting voltage is measured by a Nicolet 310 digital oscilloscope. The voltage-time plots are shown in FIG. 6. The anodization was terminated for different samples after different time durations determined from the voltage time plots. SEM and TEM observation of the samples shed light on the onset of pore formation.

SEM characterization was carried out with a Hitachi S-4000 field emission scanning electron microscope with a 20 Å resolution. Samples for TEM observation were prepared under different current density conditions but in a process time window so that the stripped film was transparent to the electron beam. Anodized samples were immersed in 15% $H_2SO_4$ for 30 minutes to round off the pores and remove debris. After rinsing with distilled water and washing with ethanol, the samples were immersed in 5% bromine/methanol solution to dissolve the aluminum substrate and release the oxide films. The stripped films were washed in distilled water, captured on TEM grids and air dried. A JEOL 100-CX system operating at 100 keV was used for the TEM studies. Pore size, pore size distribution and inter-pore separation were determined from digital analysis of bright field images using C-Imaging Systems image capture and analysis equipment.

From SEM observation of samples anodized for various time durations at various current densities, the voltage-time plots of FIG. 6 are indicators of pore nucleation. Generally, the voltage increases during the formation of a pore-free barrier layer, reaches a maximum that signals the onset of pore formation, and then reaches a steady state value where the porous film continues to grow. At higher current densities, the time to pore initiation is reduced.

Figure 7A:
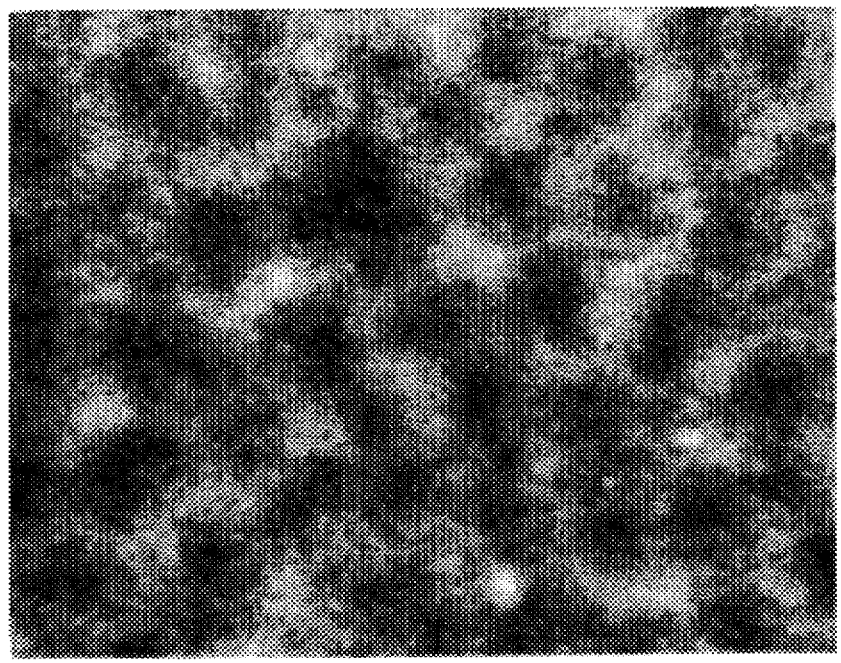
FIG. 7(a) is a field emission SEM micrograph of the surface of aluminum anodized at 10 mA/cm$^2$ current density for six seconds as part of the method of the present invention.
Figure 7B:
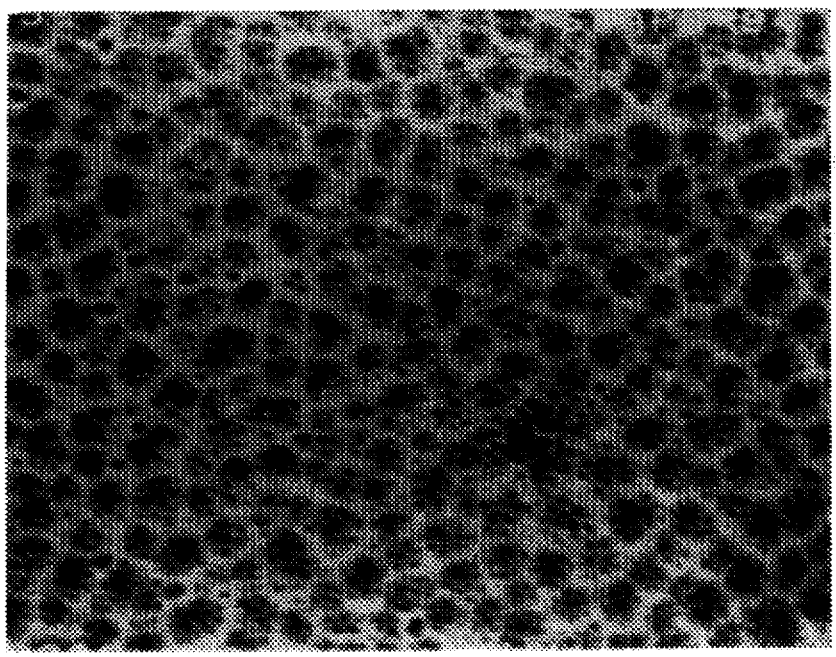
FIG. 7(b) is a field emission SEM micrograph of the surface of aluminum anodized at 10 mA/cm$^2$ current density for seven seconds as part of the method of the present invention.

For a current density of 10 $mA/cm^2$, the inflexion point in the voltage-time plot occurs at 7 seconds. Correspondingly, at 6 seconds, pores are not visible (FIG. 7(a)) while at 7 seconds (FIG. 7(b)), they have become visible.

TEM characterization revealed the following:

1. The pore density decreases and the pore diameter increases slightly with increasing current density.
2. The control over pore size, shape, interpore distance and regimentation improves with increasing current density. The most regimented arrays were those produced at the highest current densities.
3. The pores nucleate around regions of higher elastic energy, such as grain boundaries or ridges on a surface. Their nucleation is also controlled by the flow pattern of acid past the surface. Therefore, control of flow pattern, such as by the use of moving electrodes, helps achieve a higher degree of regimentation.
4. The regimentation is typically better in regions of enhanced surface elastic energy. Grain boundaries are usually decorated with a extremely regimented array of pores, as are ridges on the surface. Regimentation is also better along slip lines on the surface of single crystal aluminum.

Figure 8:
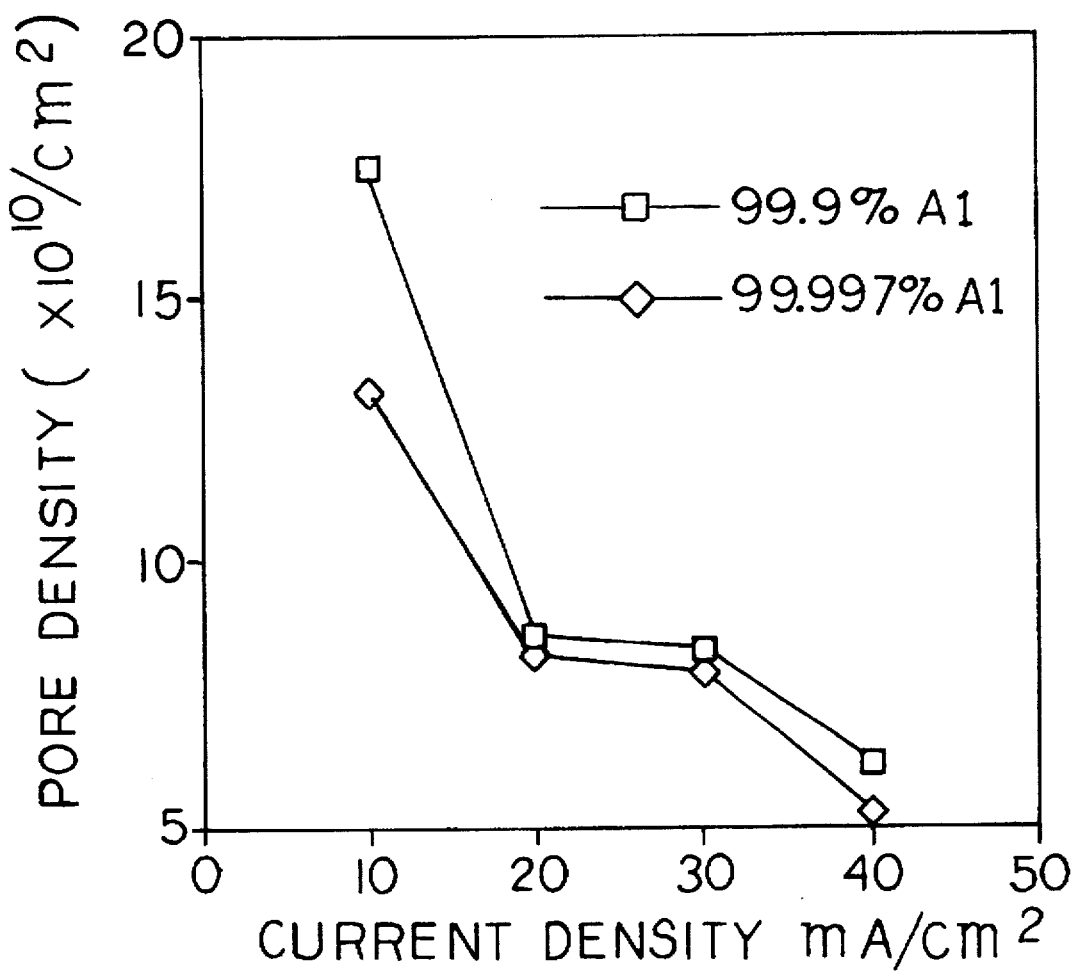
FIG. 8 is a graph showing pore density vs. anodization current density for two different grades of anodized aluminum.

FIG. 8 shows how the pore density varies with current density. This plot was generated from samples anodized at various current densities for 6 seconds and then measuring the pore density from TEM micrographs of the samples using an image capture and analysis system. Note that the pore density for anodization carried out at 10 $mA/cm^2$ is $1.8 \times 10^{11}/cm^2$.

Figure 9:
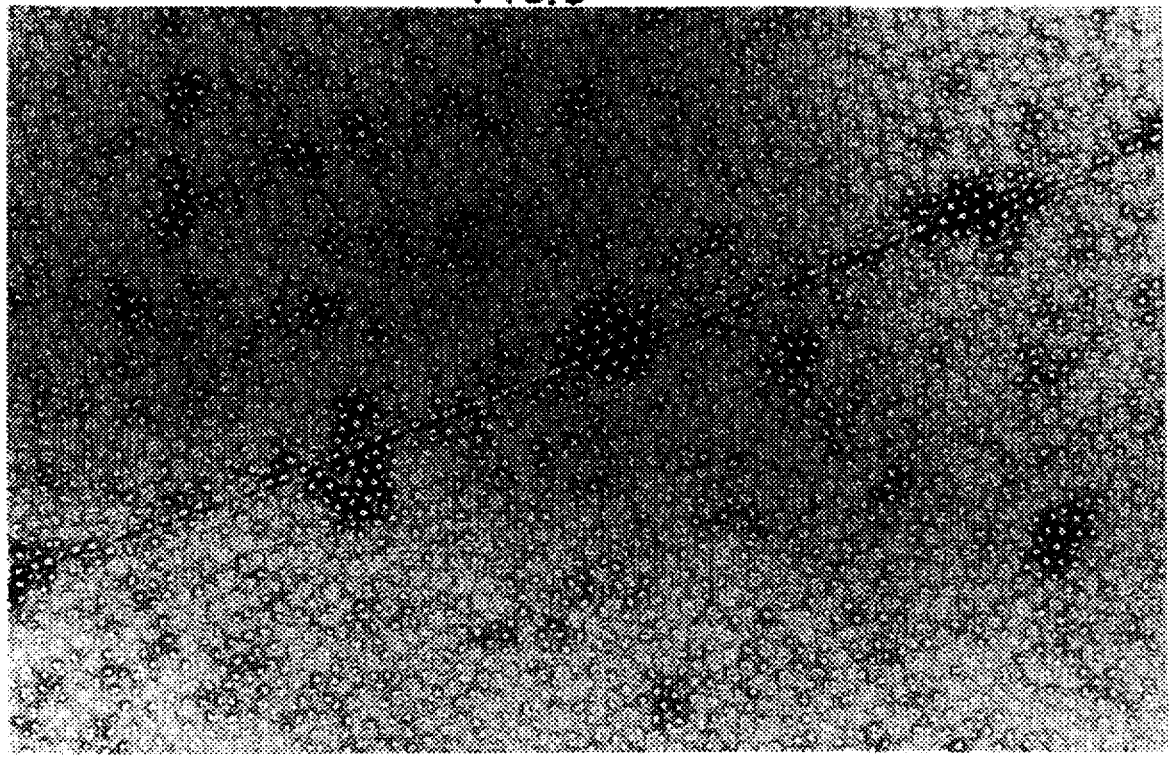
FIG. 9 is a bright field TEM image of pores nucleating on an aluminum substrate anodized in $H_2SO_4$ (pH=0.6) at room temperature for 2 seconds at a constant voltage of 30 V as part of the method of the present invention. The magnification is 17,500×.
Figure 10:
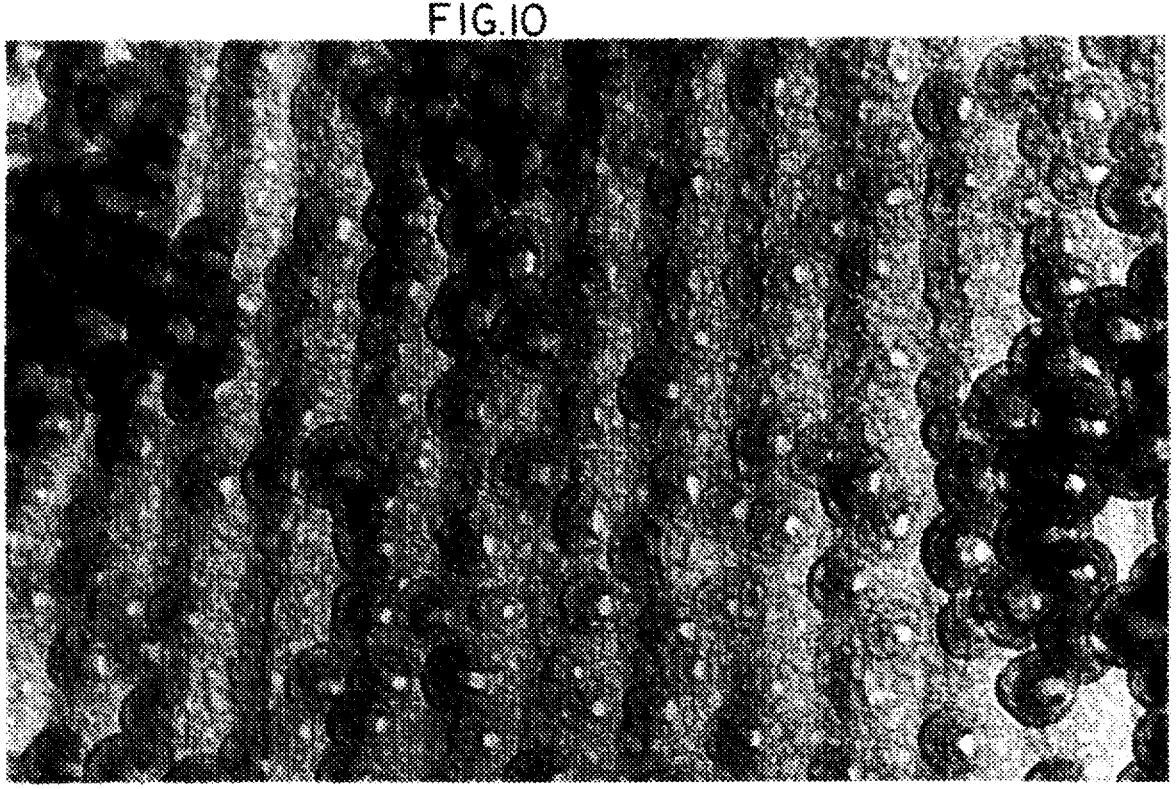
FIG. 10 is a bright field TEM image of pores nucleating on an aluminum substrate processed under the same conditions as the sample shown in FIG. 9. The magnification is 100,000×.

FIGS. 9 and 10 show how pores begin to nucleate after 2 and 3 seconds when anodization is carried out in $H_2SO_4$ with a current density of 30 $mA/cm^2$.

Figure 11:
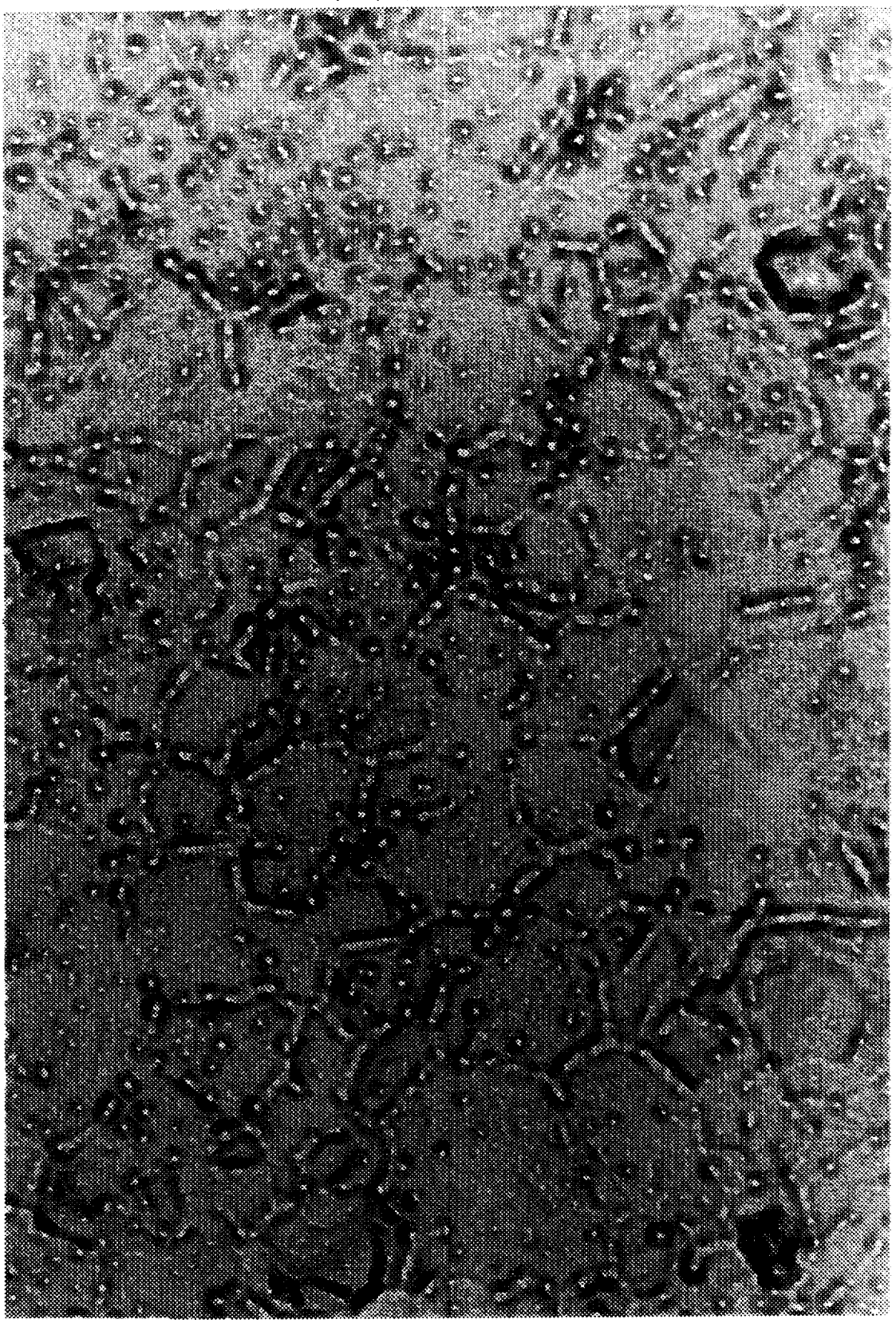
FIG. 11 is a bright field TEM image of pores nucleating on a 3,000 Å thick layer of aluminum resistively evaporated on a single crystal silicon substrate as part of the method of the present invention. The layer was anodized in $H_2SO_4$ (pH=0.6) at a constant current density of 30 mA/cm$^2$. The magnification is 90,000×.
Figure 12:
FIG. 12 is a higher magnification bright field TEM image of the sample shown in FIG. 11. The magnification is 250,000×.
Figure 13:
FIG. 13 is a bright field TEM image of pores nucleating on an aluminum substrate that was not electropolished prior to anodization. The magnification is 72,000×.
Figure 14:
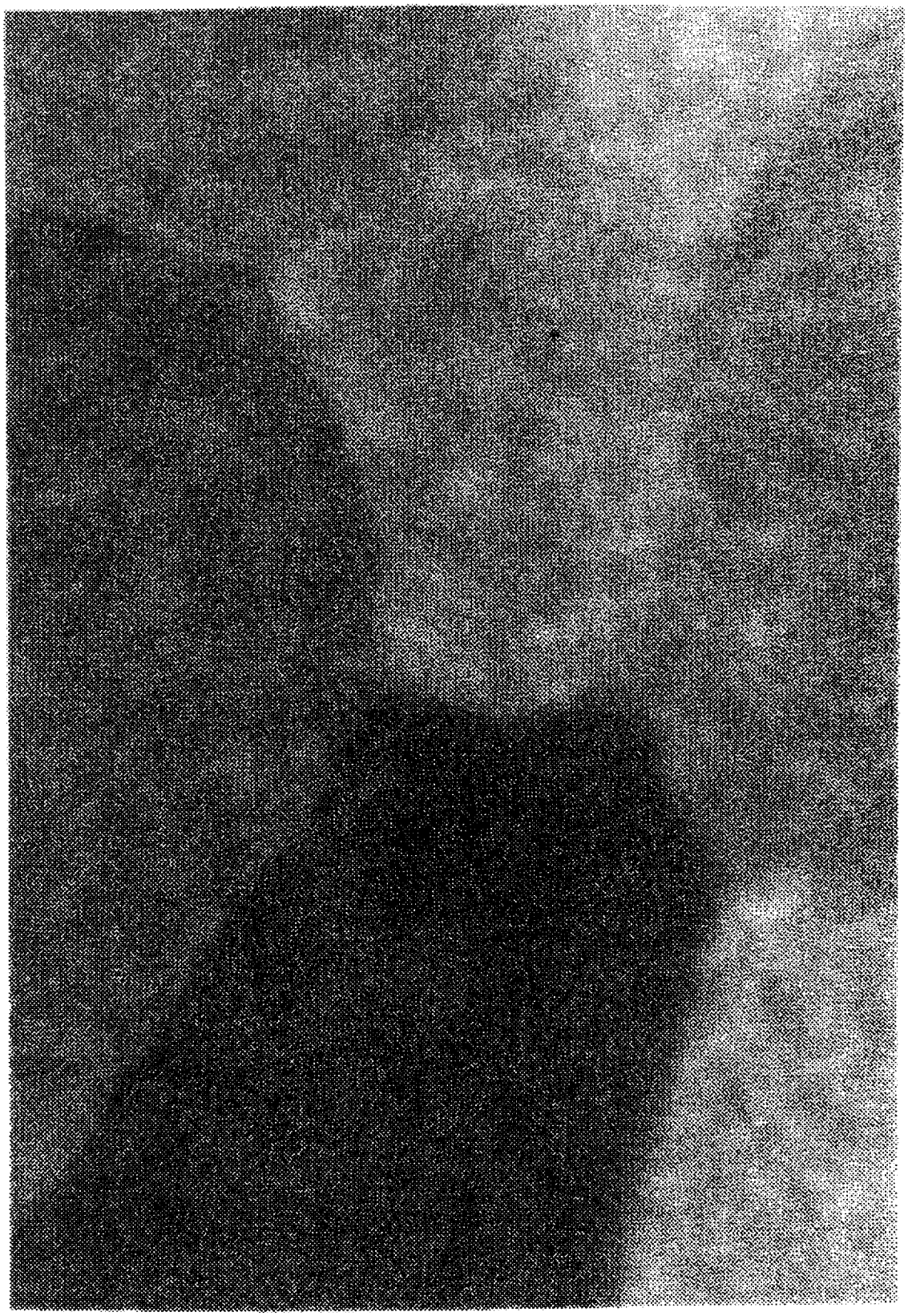
FIG. 14 is a bright field TEM image of pores formed on various grains in a large grained polycrystalline aluminum substrate anodized in $H_2SO_4$ (Ph=0.6) at room temperature for 6 seconds at a constant current density of 30 mA/cm$^2$ as part of the method of the present invention. The magnification is 12,000×.

FIG. 11 is a bright field TEM image of pores nucleating on a 3,000 Å thick layer of aluminum resistively evaporated on a single crystal silicon substrate. The evaporated layer was composed of ultra-fine grained aluminum with typical grain diameters of one μ. The layer was anodized in $H_2SO_4$ (pH=0.6) and room temperature with a constant current density of 30 $mA/cm^2$. The magnification is 90,000×. FIG. 12 shows the same sample at a higher magnification and indicates that grain boundaries are preferred sites for initial pore formation. FIG. 13 is a bright field TEM image of pores nucleating on an aluminum substrate that was not electropolished prior to anodization. Consequently, ridges remained on the surface and well regimented pores formed along the ridges whereas elsewhere the regimentation is poor. FIG. 14 is a bright field TEM image of pores formed on various grains in a large grained polycrystalline aluminum substrate anodized in $H_2SO_4$ (pH=0.6) at room temperature for six seconds with a constant current density of 30 $mA/cm^2$. The magnification is 12,000×. Some (but not all) grain boundaries are decorated with an extremely regimented array of pores. The lighter shades in the figure indicates smaller film thicknesses. The thickness of the anodized film (and hence the pore depth after a certain duration of anodization at a given current density) depends on the crystallographic orientation of the aluminum surface. These figures show that (a) regimentation is improved at sites of increased elastic energy, and (b) the pore depth (and hence the length of quantum wires that will result after the growth step) depends on the crystallographic orientation of the aluminum surface.

Figure 15:
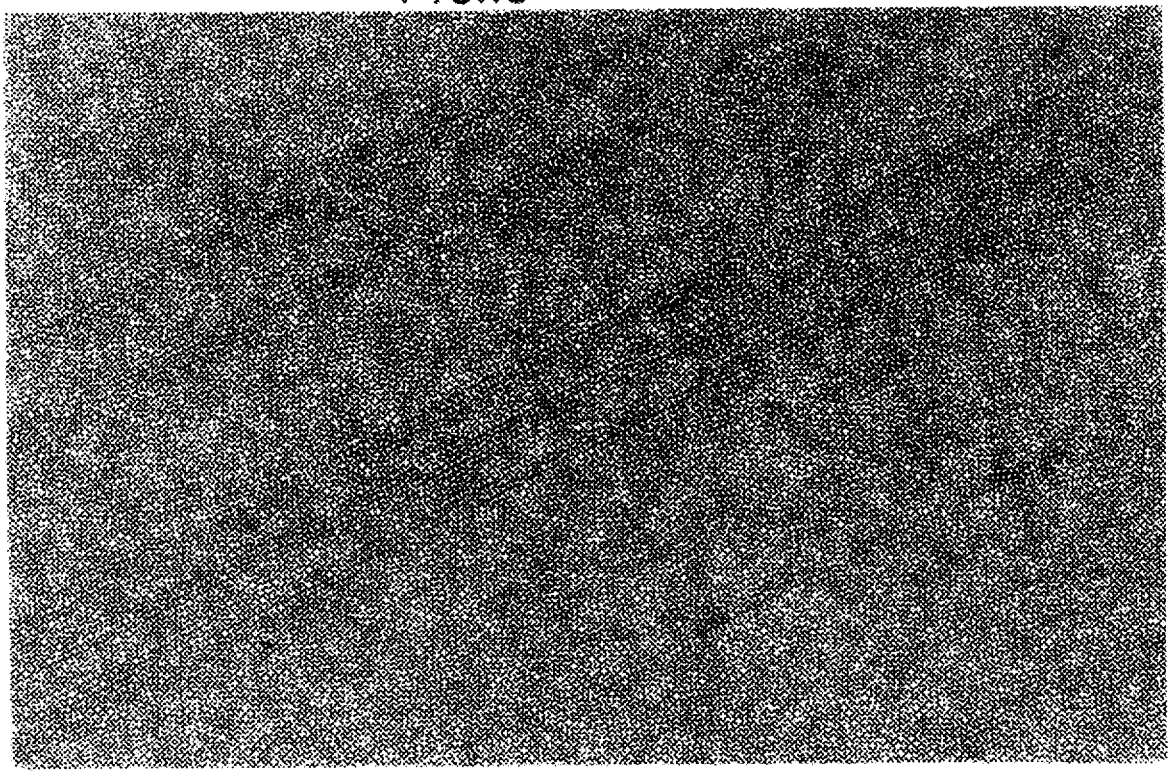
FIG. 15 is a bright field TEM image of pores on cold worked aluminum that was anodized at a current density of 40 mA/cm$^2$ as part of the method of the present invention. The magnification is 30,000×.
Figure 16:
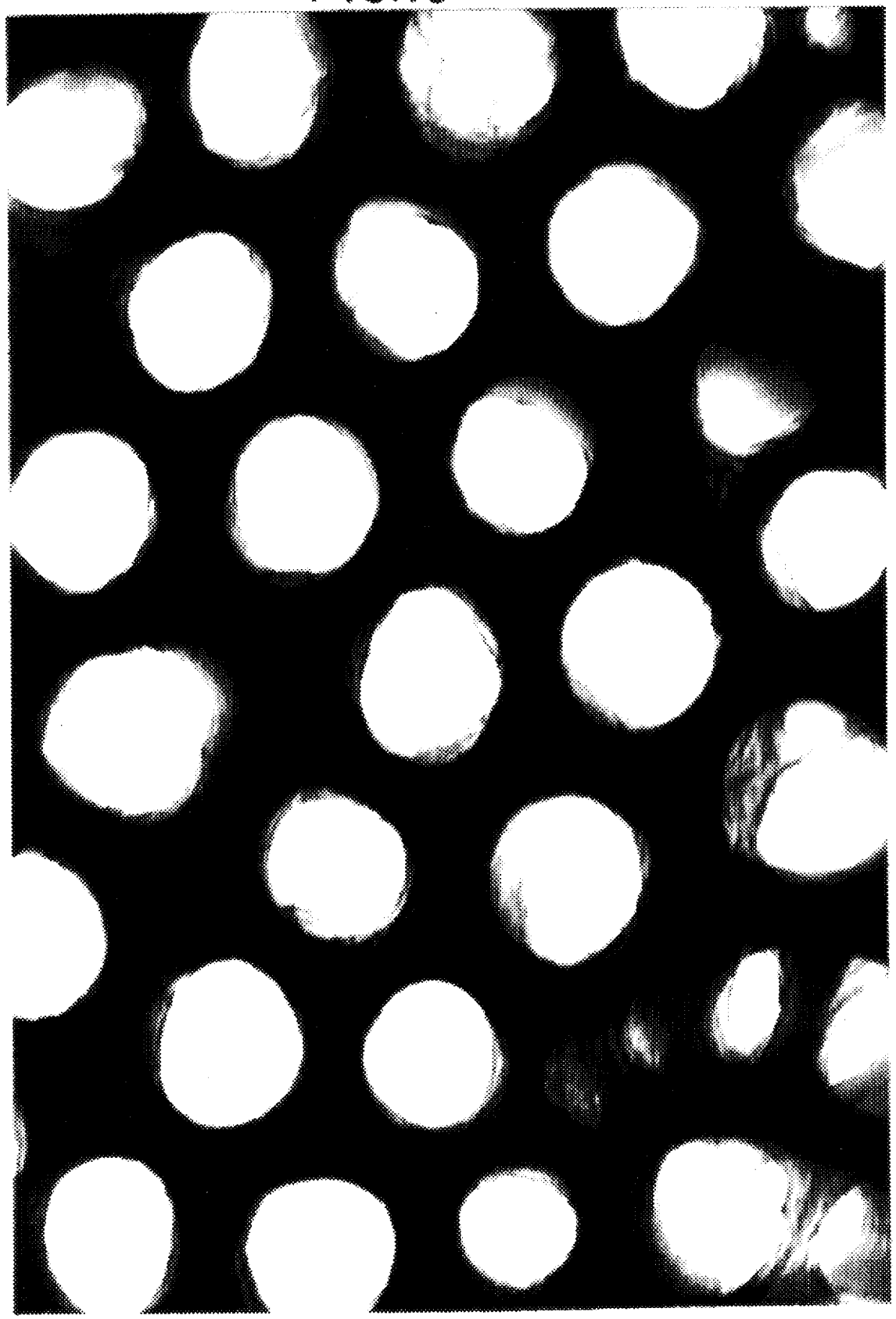
FIG. 16 is a bright field TEM image of the sample shown in FIG. 15. The magnification is 780,000×.
Figure 17:
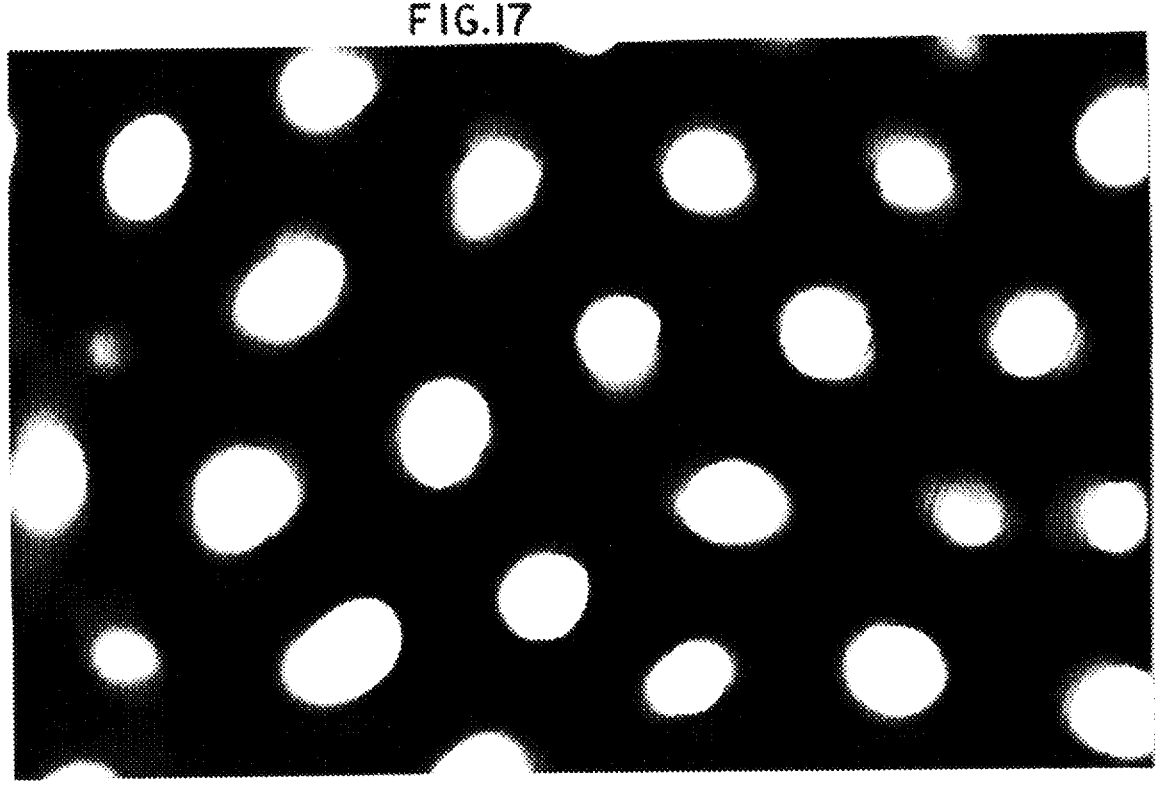
FIG. 17 is a bright field TEM image of pores on an aluminum substrate that was anodized at room temperature for 6 seconds at a constant current density of 100 mA/cm$^2$ as part of the method of the present invention. The magnification is 640,000×.
Figure 20A:
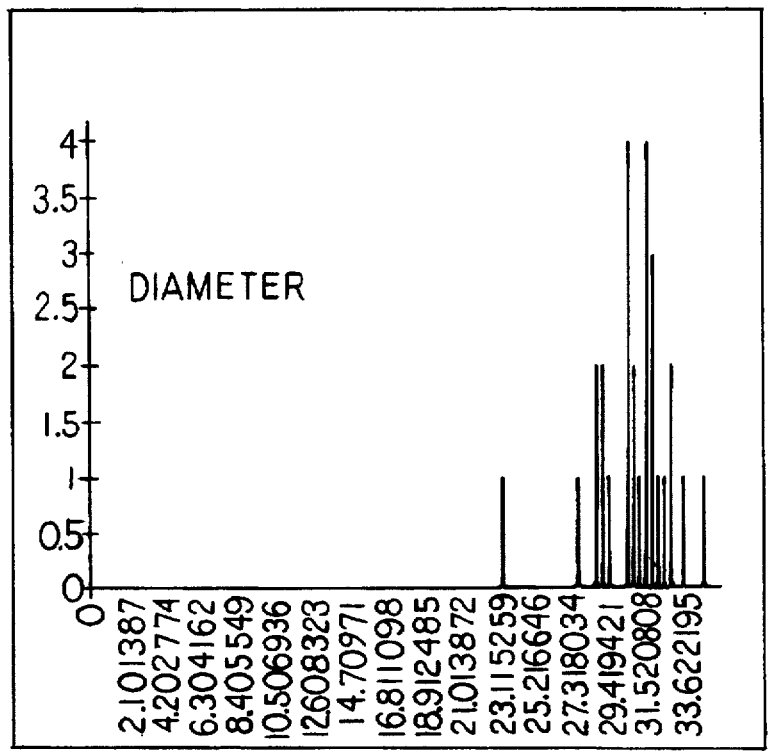
FIG. 20(a) is a histogram of the pore diameter for the sample shown in FIG. 16.
Figure 20B:
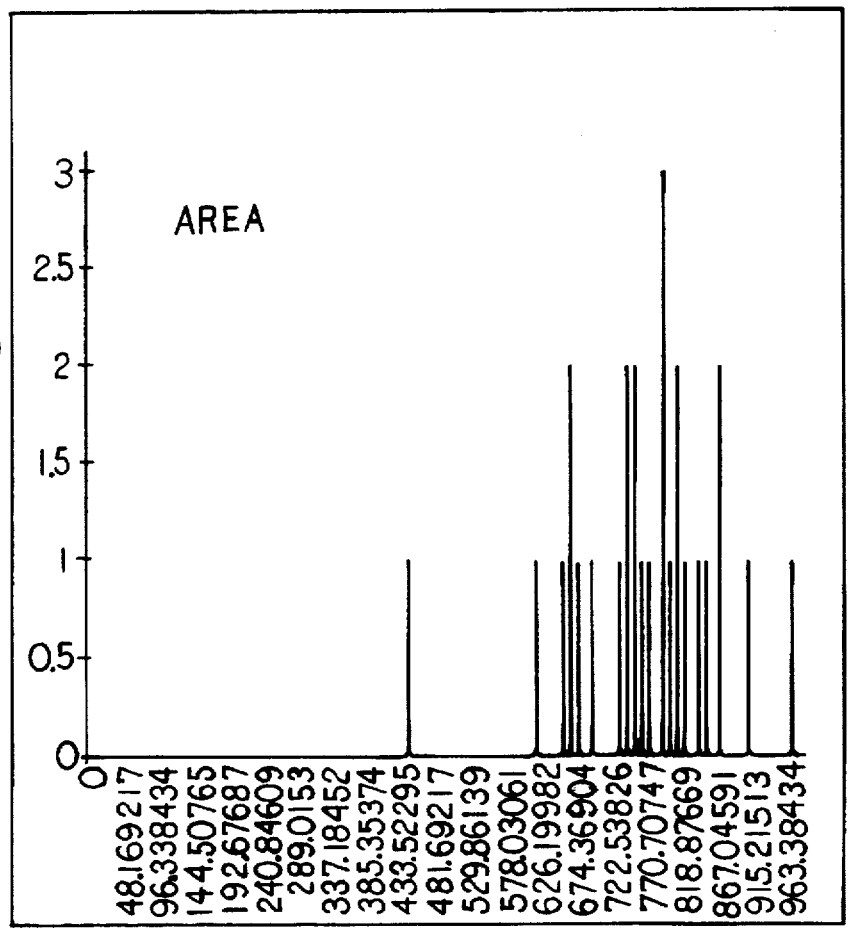
FIG. 20(b) is a histogram of the pore area for the sample shown in FIG. 17.
Figure 21A:
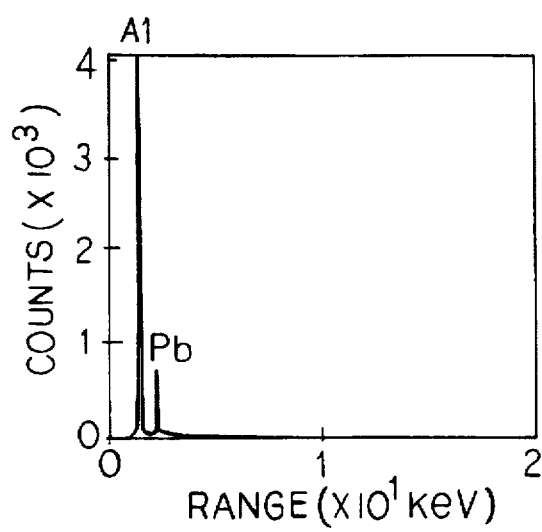
FIG. 21(a) shows energy dispursive x-ray data for lead quantum wires produced according to the method of the present invention.
Figure 21B:
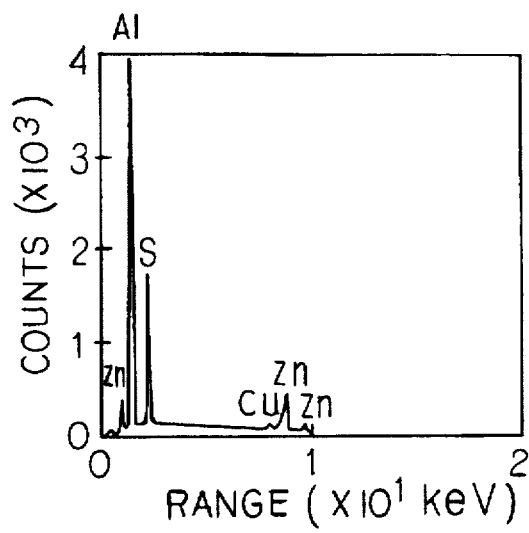
FIG. 21(b) shows energy dispursive x-ray data for ZnS quantum wires produced according to the method of the present invention.
Figure 21C:
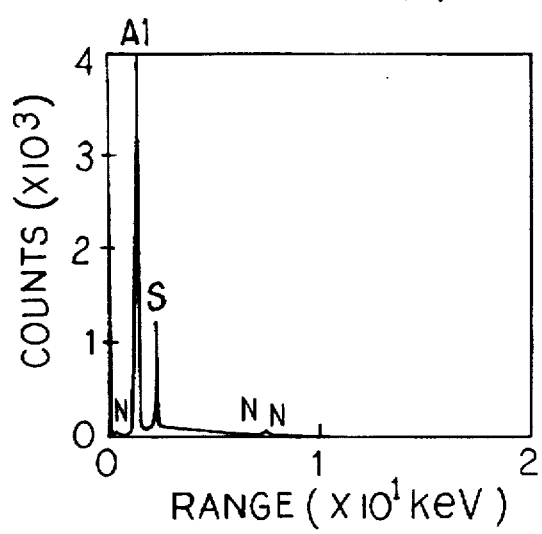
FIG. 21(c) shows energy dispursive x-ray data for Ni quantum wires produced according to the method of the present invention.
Figure 21D:
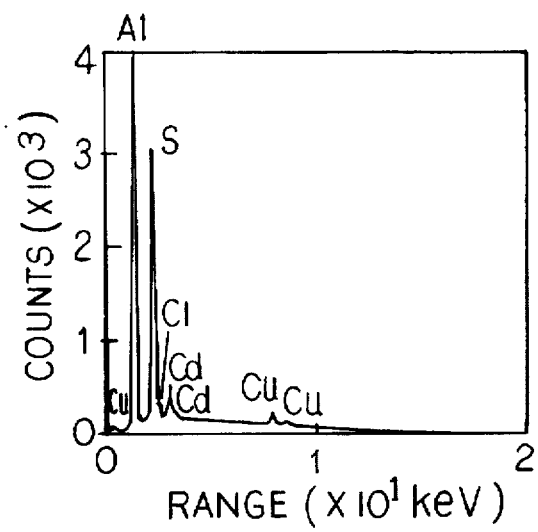
FIG. 21(d) shows energy dispursive x-ray data for CdS quantum wires produced according to the method of the present invention.

In order to improve regimentation via increased eleastic energy at the surface, cold-worked samples were also processed by the method of the present invention. For cold-worked aluminum anodized at 40 $mA/cm^2$, very uniform pore size and inter-pore separation, as well as excellent long range regimentation in certain strips of regions that border on periodicity resulted. FIG. 15 is a TEM micrograph with 30,000× magnification to show the long range order in isolated strips ~1000 Å wide and several μm long. These regions are separated by regions with short range order. The pore density is $4 \times 10^{10}/cm^2$. FIG. 16 is a higher magnification micrographs showing the pore shape and uniformity in size, shape and inter-pore separation. The mean pore diameter is 160 Å and the interpore separation is 433 Å. The standard deviation of these measurements are 10% and 4%, respectively. FIG. 17 shows the results when the anodization current density is increased to 100 $mA/cm^2$ for 6 seconds in an effort to improve the control over pore size, shape (roundness) and regimentation. The mean pore diameter in this specimen was enlarged to 321 Å by dissolution in $H_2SO_4$ and the inner pore separation is 540 Å. FIG. 17 shows an excellent degree of control over the dot size and inner dot separation, as well as the degree of regimentation over periodicity. Tables I and II (FIGS. 18 and 19) show the pore statistics measured from FIGS. 16 and 17, respectively. FIGS. 20(a) and 20(b) are histograms of the distribution in area and pore diameter.

The materials deposited within the pores have been characterized by four methods: Energy dispersive x-ray analysis, optical characterization (such as photoluminescence and Raman spectroscopy), magnetic and transport studies, and cross-sectional TEM. The results are described below.

Energy dispersive analysis of x-ray was carried out for Pb (a superconductor), Ni (a ferromagnet) and CdS/ZnS (wide gap II–VI semiconductor) quantum wires. The data are shown in FIGS. 21(a)–21(d). The following features stand out. We observe sulfur contamination in all cases except Pb. All materials are electrodeposited from a bath containing the $SO_4$ salts of the metals. They can also be electrodeposited from acetate-salts. For example, Pb is electrodeposited from a bath containing $Pb(CH_3COO)_2$ instead of $PbSO_4$ which is insoluble.

Figure 22:
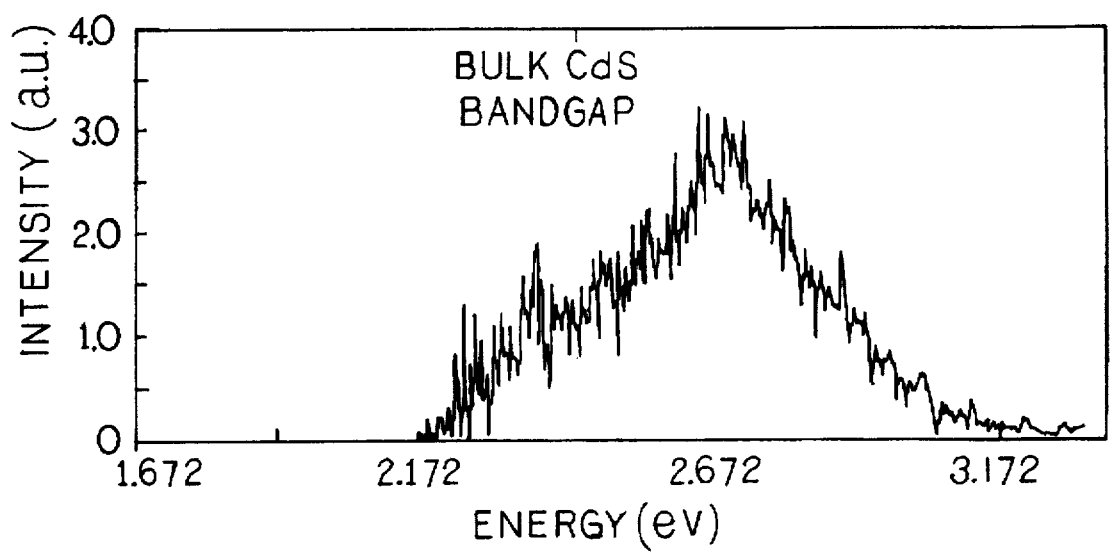
FIG. 22 is a photoluminescence spectrum of CdS quantum dots.

Photoluminescence characterization of CdS deposited within pores was carried out by a collaborator. The photoluminescence data is shown in FIG. 22 for three different samples that were electrodeposited for three different time durations. The fact that these samples photoluminesce at all indicates that they are not depleted of carriers, unlike similar semiconductor quantum dots fabricated by electron beam lithography.

The interesting feature in the spectrum is that it shows definite indication of quantum confinement. The spectrum peak is blue shifted by 200 meV from the bulk value (bulk CdS bandgap at the measurement temperature of 14 K is ~2.56 eV). This blue shift corresponds to a quantum dot diameter of ~60 Å if we assume a hardwall, square well confining potential and the bulk value for the electron and heavy-hole effective masses ($m^*_e=0.21m_o$, and $m^*_{hh}=0.8m_o$). This 60 Å diameter is somewhat less than what quantitative image analysis indicates. The latter indicates that the physical quantum dot diameter is ~130±10 Å. However, if the side depletion of the dots (caused by Fermi level pinning) is a mere 35 Å, or 35 Å of the periphery has very efficient non-radiative recombination centers which are caused by interface states, then the effective optical dot diameter is 60 Å which agrees with the photoluminescence spectrum. A mere 35 Å side depletion is very reasonable for these systems.

Another feature of FIG. 22 is the unusual width of the photoluminescence spectrum (~300 meV full width at half maximum). There are three possible sources for this broadening:

1. Homogeneous broadening caused by either impurities, surface states or by the fact that the CdS quantum dots are amorphous and not crystalline. The dots were annealed for six hours at 150° C. to recrystallize them. However, this may not have been sufficient.

2. Inhomogeneous broadening in the system. We found that even a 20 Å variation in the effective dot diameter will result in an inhomogeneous broadening of ~150 meV. This problem is pathological of extreme quantum confined structures.

3. It is also possible that the broadening is caused by non-linear optical effects. The laser power for these studies was quite high. If non-linear effects are manifested at this power (and they are expected to be) then harmonic generation may cause a wide spectrum.

Figure 23:
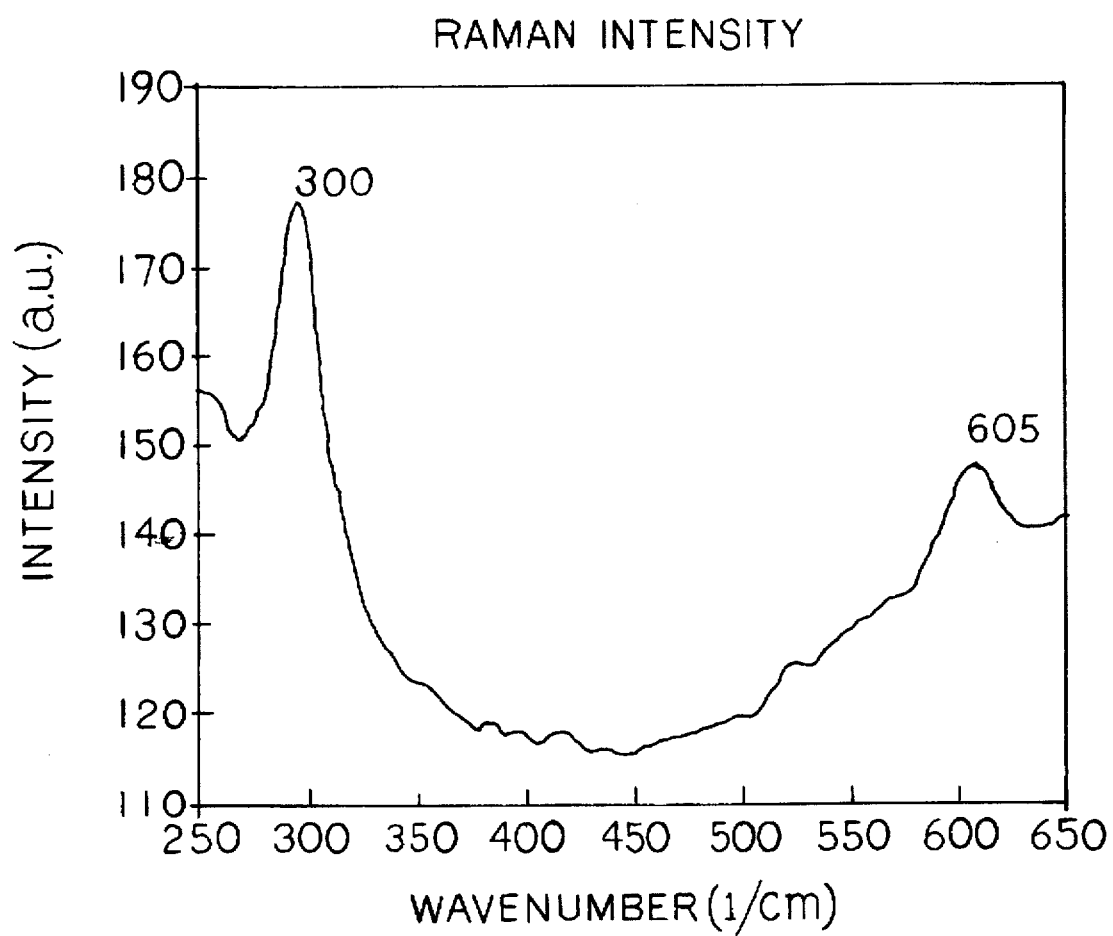
FIG. 23 is a raman spectra of CdS quantum dots.

In addition to photoluminescence, Raman spectroscopy of CdS quantum dots have also been performed by a collaborator. The data are shown in FIG. 23 where the longitudinal optical (LO) phonon peak for CdS and a peak at twice the LO frequency is consistently observed. These data indicate that the material formed within the pores is CdS.

Figure 24:
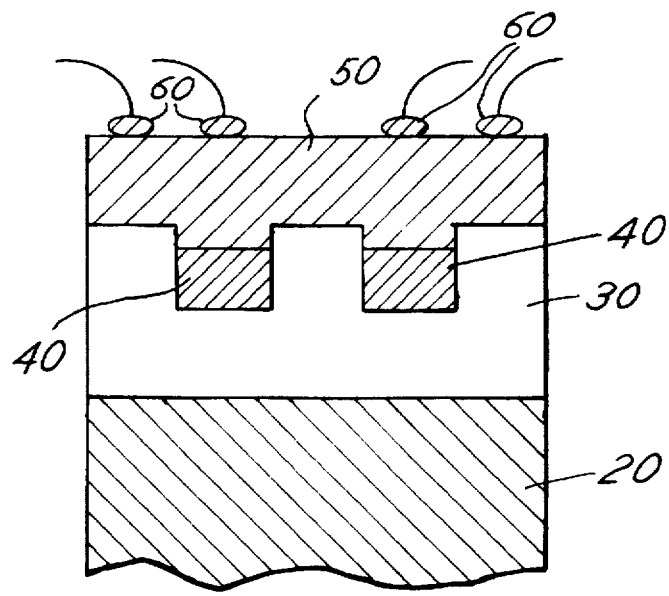
FIG. 24 shows a nanostructure according to the present invention.

It was theoretically predicted that the magnetic quantum structure shown in FIG. 24 (having an aluminum substrate 20, an aluminum oxide layer 30, nickel quantum date 40, copper layer 50 and a plurality of contacts 60) should exhibit a novel giant magnetoresistance effect caused by remote spin-dependent scattering from the magnetic moments of the Ni quantum dots. We analyze this effect following the phenomenological model of A. E. Berkowitz, et al., *Phys. Rev. Lett.*, 68, 3745 (1992).

The conductivity of this system measured between the two contacts can be written as $$\sigma = \frac{ne^2\tau}{m}, \quad (1)$$

where n is the electron concentration in the Cu layer, m is the electron's effective mass and $\tau$ is the momentum relaxation time or transport lifetime. Following Mathiesson's rule $$\frac{1}{\tau} = \frac{1}{\tau_{Cu}} + \frac{1}{\tau_{Ni}}, \quad (2)$$

where the first term is the momentum relaxation rate in Cu and the second term is the spin-dependent relaxation rate associated with the ferromagnetic Ni. This term is given by $$\frac{1}{\tau_{Ni}} = \zeta(1 + \lambda\vec{\sigma}\cdot\vec{M}_{Ni}), \quad (3)$$

where $\vec{\sigma}$ is the Pauli spin vector for the electrons, $\vec{M}_{Ni}$ is the magnetization of the Ni quantum dots (normalized with respect to the saturation magnetization) and $\lambda$ is a parameter that is indicative of the strength of remote scattering (note that the ferromagnetic dots do not lie in the path of the electrons unlike in conventional granular films and immiscible alloys). When no magnetic field is present, the magnetization of the Ni dots (at room temperature) is zero. It reaches a value of unity ($\vec{M}_{Ni}=1$) at the saturation field $H_s$. At this field strength, the electrons whose spins are aligned parallel and anti-parallel with the field have different conductivities given by $$\sigma^{\pm} = \frac{ne^2}{m}\left[\frac{1}{\tau_{Cu}} + \zeta(1\pm\lambda)\right]^{-1} \quad (4)$$

where the + superscript refers to spins aligned along the field and the − superscript to spins anti-aligned.

Unless we use a spin-polarized contact (such as an Fe contact or permalloy contact), the distribution of electrons injected from the contacts is even between parallel and anti-parallel spins. Therefore, the conductivity at the saturation magnetic field is $$\sigma(H=H_s) = \frac{\sigma^+ + \sigma^-}{2} = \frac{ne^2}{m}\left[\frac{1/\tau_{Cu}+\zeta}{(1/\tau_{Cu}+\zeta)^2-\zeta^2\lambda^2}\right] \quad (5)$$

while the conductivity at zero magnetic field is $$\sigma(H=0) = \frac{ne^2}{m}\frac{1}{1/\tau_{Cu}+\zeta} \quad (6)$$

Such a system will therefore produce a negative magnetoresistance as long as $\lambda$ and $\zeta\neq 0$.

Figure 25:
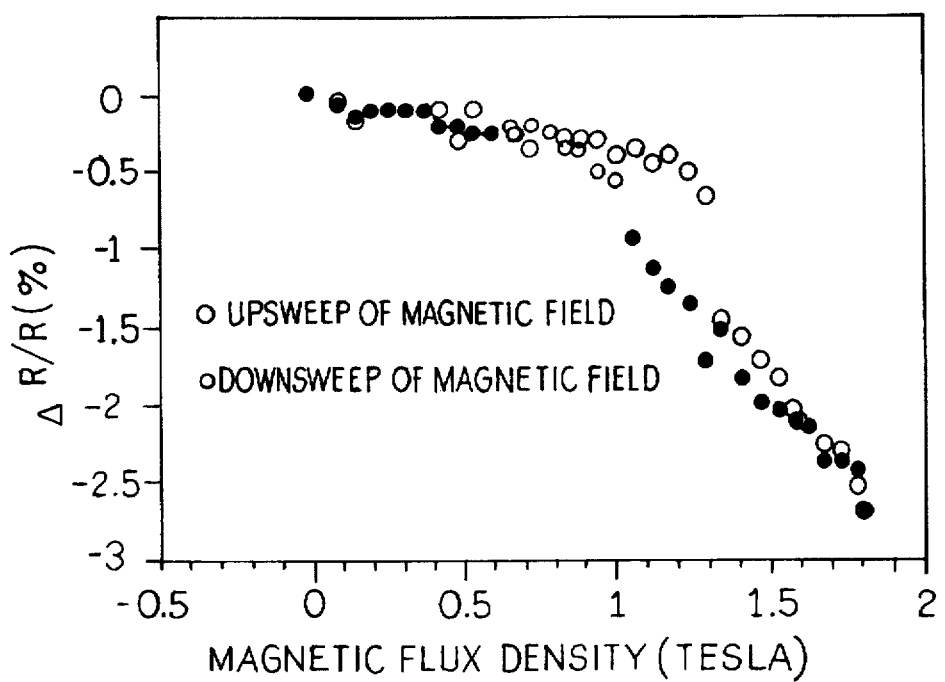
FIG. 25 shows the magnetoresistance data at room temperature for the structure of FIG. 24.

The above structure was tested at room temperature and the magnetoresistance data is shown in FIG. 25. There is a giant magnetoresistance $((\rho(H=0)-\rho(H=H_s))/\rho(H=0)$ of 3% which is very large for room temperature. This indicates the systems produced according to the process of the present invention are capable of exhibiting quantum effects.

To verify that the structure of FIG. 24 could be fabricated, we obtained a cross-sectional TEM picture of a structure that was identical to the structure producing the results of FIG. 25, except that the anodization was carried out for five minutes rather than a few seconds. This caused the thickness of the anodized film to be a few microns rather than a hundred or a few thousand angstroms. This thickness is the minimum required for successful cross-section TEM specimen preparation.

Figure 26:
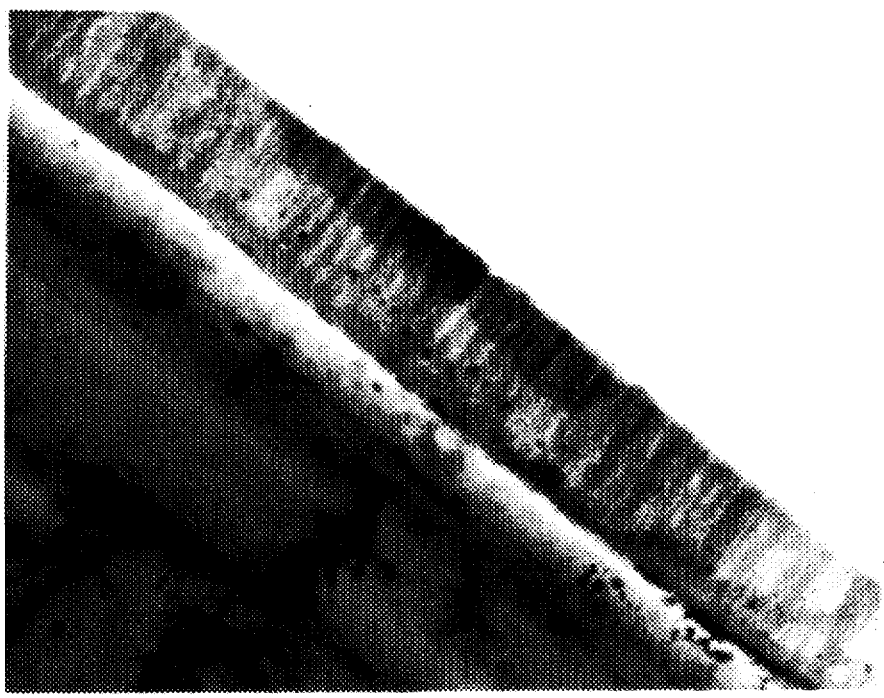
FIG. 26 is a cross-sectional image of TEM pores filled with Ni by the method of the present invention.

The cross-section TEM micrograph is shown in FIG. 26 where the depthwise cross-section of the pores is clearly visible. Note that the black particles at the bottom of the pores are Ni quantum dots. This picture shows that material can be preferentially electrodeposited within the pores to realize quantum dot arrays.

The foregoing demonstrates that the process of the present invention creates regimented arrays of pores reproducibly and controllably. The applications of the process are countless. A few examples follow:

1. The structures described above and shown in FIGS. 24–26 show ~3% magnetoresistance at room temperature. The structure exhibits a change in its electrical resistance when it is subjected to an external magnetic field. This effect can be used for magnetic recording, stripe readers, recording heads and nonvolatile memory.

2. The structure described and shown in FIGS. 24-26 is expected to exhibit strong magnetocaloric effect. This effect can be used for non-chemical solid state refrigerant and is environmentally friendly (no chemicals are used). Such refrigeration is believed to be energy efficient in many applications, such as in electric cars.

3. The CdS quantum dot array can result in a non-linear optical material whose reflectivity will depend on the intensity of the incident light. This can be used to realize non-linear optical devices. The non-linearity will be manifested at very low levels of incident light energy since rapid phase space filling will occur in such small structures at low or moderate levels of optical excitation. The low threshold intensity for the onset of non-linearity is very attractive for low power applications and allows one to increase the density of optical elements on a chip by orders of magnitude since it relaxes the demands on heat sinking. Note that for this type of non-linear optical applications, it is important to have small dot size and high packing density, but the regimentation is not important.

Figure 27A:
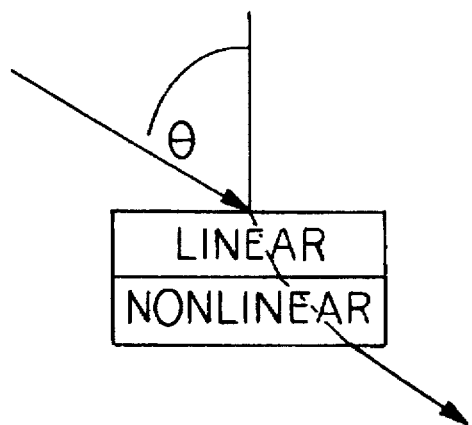
FIGS. 27(a)–27(b) are a schematic of a nonlinear optical switch incorporating a nanostructure according to the present invention.
Figure 27B:
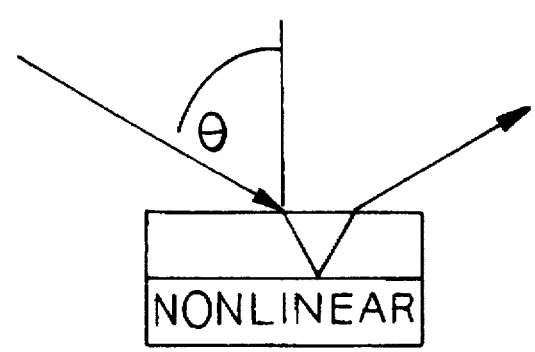

The non-linear optical material can be used for a variety of purposes such as switches, modulators, limiters, mixers, couplers, optical logic elements, etc. An example is the non-linear optical switch shown in FIGS. 27(a)–27(c). FIGS. 27(a) and 27(b) show how a light beam passing through a linear region 70 to a non-linear region 80 switches from partial reflection to total reflection as the intensity of the beam is increased. This happens since the refractive index of the array changes with changing intensity as a result of optical non-linearity.

Figure 27C:
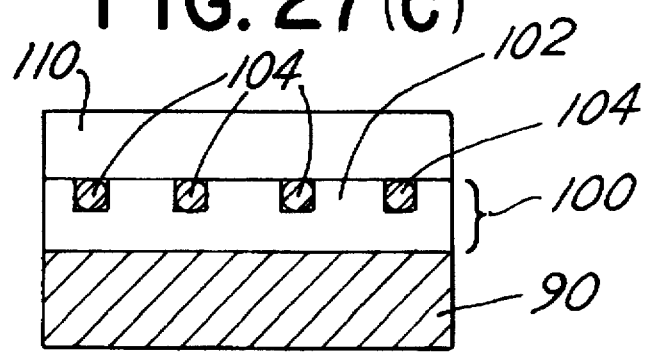
FIG. 27(c) shows the structure of a switch illustrated in FIGS. 27(a)–27(b).

FIG. 27(c) shows such a device, which includes an aluminum substrate 90, a non-linear region 100 comprising aluminum oxide layer 102 and quantum date 104, and a linear region 110 comprising sputtered Ge. This type of switch can be ultrafast and operate at low levels of optical excitation. The switching time will be a few tens of femtoseconds if the non-linearity is associated with virtual absorption processes as opposed to real processes. The latter operate on time scales of the order of the radiative recombination lifetime. Actually, even real processes can be quite fast in extreme quantum confined structures. Quantum confinement usually reduces the radiative recombination lifetime by orders of magnitude since it vastly increases the overlap between the electron and hole wave functions. The radiative recombination lifetime in 100 Å diameter CdS quantum dots has been calculated to be 20 ps. Therefore, even if the non-linearity is caused by real processes, the switching time in quantum dots (as opposed to bulk structures) will be very small. This is a major advantage.

A non-linear optical switch of the above type has applications in a variety of areas including ultrafast couplers, limiters and logic elements. It also has a specific application in laser countermeasures. A quantum dot array can act as a smart optical radiation shield that is transparent at low intensities but opaque (or reflective) at high intensities. This will allow friendly optical communication to get through but will protect against unfriendly environment or hostile intent. Such a smart protective shield could be used to protect satellites.

Another possible application of this material is in ultrafast opto-electronic device as shown in FIGS. 28(a), where an array of quantum dots 150 is disposed between a pair of Schottky gate pads 160. Application of a gate voltage between the two metal pads will quench the photoluminescence of the quantum dots by a process known as Quantum Confined Stark Effect.

4. The above process can be used to realize superconducting quantum dot arrays. Preliminary experiments have shown that such superconducting quantum dots exhibit a significant enhancement in the transition temperature. This is extremely important for the application of superconductors in microwave elements (radar detectors, antennas, etc.) and electronics.

5. A sample for such an application will consist of a ferromagnetic material such as Fe, Ni or Co electrodeposited within the pores resulting in an array of ferromagnetic quantum dots. Each dot acts as a binary bit storage element. For such applications, regimentation of the dots is not important; instead, what is more important is the areal density of the dots or the storage capacity.

Although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A method of fabricating nanostructures, comprising the steps of:

electropolishing a single crystal substrate so as to form pits in said substrate;

anodizing said substrate to form an oxide layer having a plurality of pores thereon; and depositing material within said pores.

2. The method according to claim 1, wherein anodization is performed with direct current.

3. The method according to claim 1, wherein the surface energy of said substrate is increased in certain regions of said substrate prior to anodization.

4. The method according to claim 3, wherein the surface energy of said substrate is increased by cold working said substrate.

5. The method according to claim 1, wherein anodization is achieved by immersing said substrate in an acidic bath, utilizing said substrate as a first electrode, immersing a second electrode in said bath, and passing current through said electrodes.

6. The method according to claim 1, wherein said material is deposited in said pores by immersing said substrate and said oxide film in an acidic bath, utilizing said substrate as a first electrode, immersing a second electrode in said bath, and passing current through said electrodes.

7. The method according to claim 6, wherein said current passed through said electrodes is alternating current.

8. The method according to claim 6, further comprising the steps of immersing said anodized substrate in a bath of a salt containing cation of said material.

9. The method according to claim 8, wherein said bath of a salt containing cation of said material is boiling.

10. A nanostructure manufactured by the method of claim 1.

11. A method of fabricating nanostructures, comprising the steps of:

electropolishing a substrate so as to form pits in said substrate;

anodizing said substrate to form an oxide layer having a plurality of pores thereon;

depositing material within said pores; and removing said substrate.

12. The method according to claim 11, wherein said substrate is dissolved in a solution containing bromine and methanol.

13. The method according to claim 11, further comprising the step of depositing a second material on said oxide layer and said first material prior to removing said substrate.

14. The method according to claim 13, further comprising the step of removing said oxide layer.

15. The method according to claim 14, wherein said oxide layer is removed by dissolving it in an acidic solution.

16. A method of fabricating nanostructures, comprising the steps of:

selecting a semiconducting substrate;

depositing a layer of metal on said substrate;

electropolishing said layer of metal so as to form pits therein;

anodizing said metal layer so as to convert substantially all of said metal layer to an oxide layer containing pores; and depositing material in said pores.

17. A nanostructure manufactured by the method of claim 16.

18. A nanostructure, comprising:

an aluminum layer;

a layer of aluminum oxide on said aluminum layer, said layer of aluminum oxide having at least one pore therein;

nickel deposited in said at least one pore; and copper deposited on said layer of aluminum oxide and said nickel.

19. A method of fabricating nanostructures, comprising the steps of:

electropolishing a substrate so as to form pits in said substrate;

anodizing said substrate to form an oxide layer having a plurality of pores thereon; and depositing lead within said pores.

20. A method of fabricating nanostructures, comprising the steps of:

electropolishing a substrate so as to form pits in said substrate;

anodizing said substrate to form an oxide layer having a plurality of pores thereon; and depositing semiconductor material within said pores.

21. A method of fabricating nanostructures, comprising the steps of:

electropolishing a substrate so as to form pits in said substrate;

anodizing said substrate to form an oxide layer having a plurality of pores thereon;

depositing material within said pores by immersing said substrate and said oxide film in an acidic bath, utilizing said substrate as a first electrode, immersing a second electrode in said bath, and passing current through said electrodes; and immersing said anodized substrate in a boiling bath of a salt containing cation of said material.

22. A method of fabricating a quasi periodic array of compound semiconductor quantum dots, comprising the steps of:

electropolishing a substrate;

anodizing the substrate at constant current density in an acidic electrolyte; and immersing the substrate in a bath containing a cation of the compound semiconductor.

23. The method according to claim 22 wherein the electrolyte is selenic acid.

24. The method according to claim 22 wherein the electrolyte is sulfuric acid.

25. The method according to claim 22 wherein the electrolyte is phosphoric acid.

26. The method according to claim 22 wherein the electrolyte is arsenic acid.

27. The method according to claim 22 comprising the further step of removing the substrate.

28. The method according to claim 27 comprising the further step of depositing a second material on the quantum dots prior to removing the substrate.

29. A method of producing a quantum dot array comprising the steps of:

electropolishing an aluminum substrate;

anodizing the substrate in an acid bath at constant currant density; and immersing the substrate in a bath containing lead acetate.

30. A method of producing a quantum dot array of metallic or semiconductor material comprising the steps of:

choosing a substrate;

depositing an aluminum film on the substrate;

electropolishing the film;

anodizing the film completely to convert it to a porous alumina film; and electrodepositing a metallic or semiconductor material into the pores.

31. A method of making a structure comprising the steps of:

electropolishing aluminum;

anodizing the aluminum in an acid bath at a constant current density to produce a porous alumina film;

electrodepositing nickel within the pores;

depositing a copper film on the nickel; and attaching leads to the copper film.

* * * * *